United States Patent
Yeh et al.

(10) Patent No.: US 8,372,924 B2
(45) Date of Patent: *Feb. 12, 2013

(54) PROCESSES AND APPARATUS FOR CONTINUOUS SOLUTION POLYMERIZATION

(75) Inventors: Richard Cheng-Ming Yeh, Bellaire, TX (US); Bruce C. Devoy, Livingston, TX (US); Vetkav R. Eswaran, Houston, TX (US); Rui Zhao, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 45 days.

This patent is subject to a terminal disclaimer.

(21) Appl. No.: 12/972,061

(22) Filed: Dec. 17, 2010

(65) Prior Publication Data

US 2011/0172375 A1 Jul. 14, 2011

Related U.S. Application Data

(60) Provisional application No. 61/294,871, filed on Jan. 14, 2010, provisional application No. 61/294,876, filed on Jan. 14, 2010, provisional application No. 61/294,885, filed on Jan. 14, 2010, provisional application No. 61/294,891, filed on Jan. 14, 2010.

(51) Int. Cl.
*C08F 2/00* (2006.01)
*B01J 19/18* (2006.01)

(52) U.S. Cl. ............. 526/74; 526/88; 422/134; 422/135

(58) Field of Classification Search .................... 526/88, 526/74; 422/135, 134
See application file for complete search history.

(56) References Cited

U.S. PATENT DOCUMENTS

| | | | |
|---|---|---|---|
| 2,862,243 A | 12/1958 | Farr et al. | |
| 3,207,818 A | 9/1965 | Marshall | |
| 3,804,423 A | 4/1974 | Booy | |
| 3,912,698 A | 10/1975 | Shurts | |
| 5,306,556 A | 4/1994 | Rowland | |
| 6,126,836 A | 10/2000 | Ding et al. | |
| 6,881,800 B2 * | 4/2005 | Friedersdorf | .................. 526/68 |
| 1,522,395 A1 | 7/2005 | Ekart et al. | |
| 7,163,989 B2 | 1/2007 | Friedersdorf | |
| 2004/0024146 A1 | 2/2004 | Friedersdorf | |
| 2008/0234443 A1 | 9/2008 | Kiss et al. | |
| 2010/0152396 A1 | 6/2010 | Fleury et al. | |

FOREIGN PATENT DOCUMENTS

| | | |
|---|---|---|
| EP | 0 254 826 | 2/1988 |
| EP | 0 695 719 | 2/1996 |
| EP | 1 003 814 | 5/2000 |
| GB | 889088 | 2/1962 |

(Continued)

OTHER PUBLICATIONS

T. G. Gutowski et al., "A Low-Energy Solvent Separation Method," Polymer Engineering and Science, Mar. 1983, vol. 23, No. 4, pp. 230-237.

(Continued)

*Primary Examiner* — William Cheung

(57) ABSTRACT

Described herein in one embodiment is a plant for the continuous solution polymerization of one or more monomers in a solvent, e.g., a hydrocarbon solvent. In one aspect, the plant comprises a high pressure pump and at least one heat exchanger downstream of the pump. In another aspect a feed is cooled by three heat exchangers which are refrigerated by means of a common three stage compressor. In another aspect, the plant comprises a primary reactor and a secondary reactor arranged to operate in parallel, in which the ratio of volume of the primary reactor to the secondary reactor is in the range of 60:40 to 95:5. In another aspect, a method of defouling a heat exchanger is provided in which the level of liquid refrigerant in the heat exchanger is temporarily lowered.

5 Claims, 6 Drawing Sheets

FOREIGN PATENT DOCUMENTS

| WO | WO 92/14766 | 9/1992 |
|---|---|---|
| WO | WO 94/00500 | 1/1994 |
| WO | WO 98/02471 | 1/1998 |
| WO | 01/46273 | 6/2001 |
| WO | 02/34795 | 5/2002 |
| WO | 2006/077214 | 7/2006 |

OTHER PUBLICATIONS

C. A. Irani et al., "Lower Critical Solution Temperature Behavior of Ethylene Propylene Copolymers in Multicomponent Solvents," Journal of Applied Polymer Science 1986, vol. 31, pp. 1879-1899.

Mark A. McHugh et al., "Separating Polymer Solutions with Supercritical Fluids," Macromolecules 1985, vol. 18, Issue 4, pp. 674-680.

Hajime Tanaka, "Critical dynamics and phase separation kinetics in dynamically asymmetric binary fluids: New dynamic universality class for polymer mixtures or dynamic crossover?," Journal of Chemical Physics Apr. 1, 1994, 100 (7), pp. 5323-5337.

S. J. Han et al., "Short Chain Branching Effect on the Cloud Point Pressures of Ethylene Copolymers in Subcritical and Supercritical Propane," Macromolecules 1998, vol. 31, pp. 2533-2538.

* cited by examiner

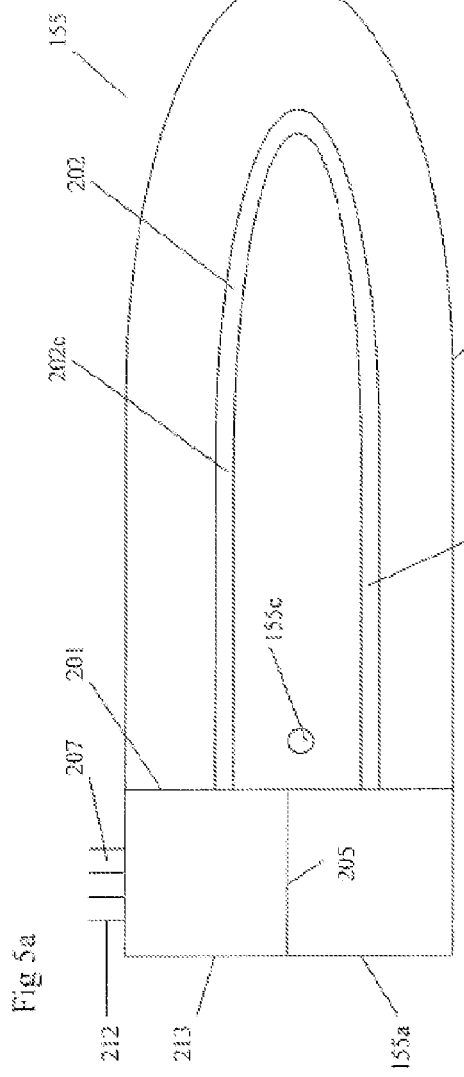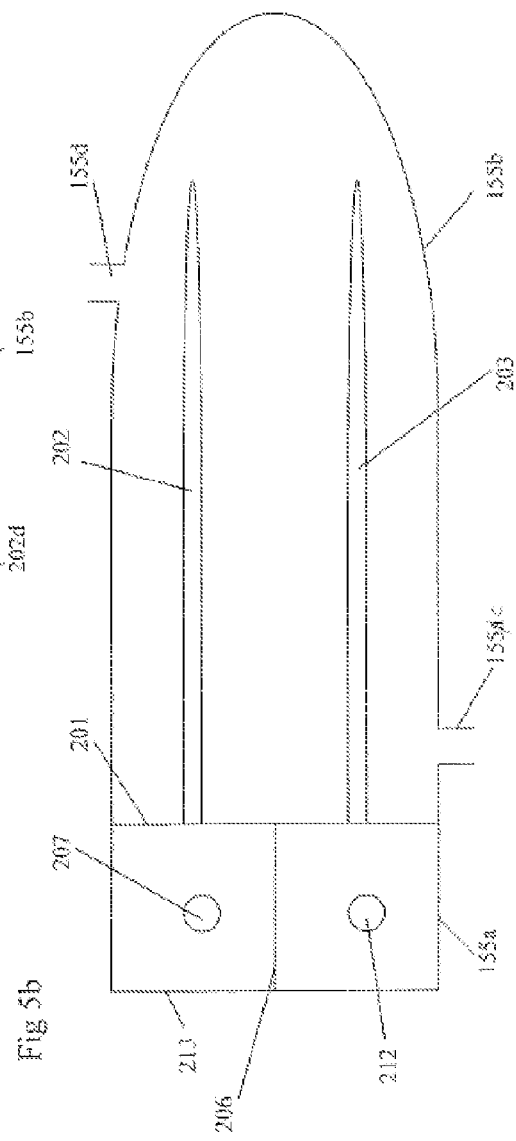

PROCESSES AND APPARATUS FOR CONTINUOUS SOLUTION POLYMERIZATION

CROSS REFERENCE TO RELATED APPLICATIONS

This application claims the priority to and the benefit of U.S. Ser. No. 61/294,871, filed Jan. 14, 2010. This application is related to the following concurrently filed U.S. Provisional applications: U.S. Ser. No. 61/294,876 (2010EM004), U.S. Ser. No. 61/294,885 (2010EM005), and U.S. Ser. No. 61/294, 891 (2010EM006), each of which was filed Jan. 14, 2010 and is incorporated herein by reference in their entirety.

FIELD OF INVENTION

Described herein are processes and apparatuess for continuous solution polymerization.

BACKGROUND OF INVENTION

Continuous solution polymerization processes generally involve the addition of catalyst to a monomer and solvent mixture. The mixture may be back-mixed giving a uniform polymer in an environment with substantially no concentration gradients. WO 94/00500 (Pannell et al.), incorporated herein by reference, describes a solution polymerization using metallocene in a continuous stirred tank reactor, which may be in a series reactor arrangement to make a variety of products.

The heat of the polymerization reaction can be absorbed by the polymerization mixture, causing an exotherm. Alternatively, or in addition, the heat of reaction can be removed by a cooling system, by external cooling of the walls of the reactor vessel, by internally arranged heat exchange surfaces cooled by a heat exchange fluid, by an external heat exchanger through which the contents of the reactor are continuously circulated, by an overhead condenser which constantly cools and condenses vapors rising from the reactor, or by a combination of these means.

In the course of the polymerization, typically, a predominant amount (over 50 mol % of the monomer or monomers) is consumed and the polymer formed is dissolved in the solvent. The higher the concentration of the polymer, the higher the viscosity of the polymerization reaction mixture containing the polymer, solvent, and unreacted components. The mixture passes from the polymerization reactor to a finishing section in which polymer, solvent and unreacted monomer are separated. In the course of finishing, solvent and unreacted monomer are progressively removed from the polymerization mixture until the polymer can be formed into a solid pellet or bale. The separated solvent and monomer can be recycled to the polymerization reactor.

It is well known from extensive literature sources that polymer solutions can undergo phase separation at the lower critical solution temperature, with phase separation being encouraged by higher temperatures and/or by lower pressures. Solvents selection also influences the conditions where phase separation occurs.

The phenomenon of phase separation is firstly a consideration in the selection of the polymerization solvent. Appropriate polymerization monomer conversions, especially of the volatile monomers, temperatures, and pressures have to be selected for given polymer/solvent combination conditions to avoid unwanted phase separation inside the reactor. Solvents such as hexane may require an elevated pressure in excess of 50 bar to avoid two-phase conditions for olefin polymerization; solvents such as octane can maintain homogeneous single-phase conditions at lower pressures.

In some solution polymerization processes the phenomenon of phase separation is exploited after the reaction step to separate volatile solvent and unreacted monomer components on the one hand, and polymer on the other hand. In that case, separation at temperature well above the lower critical solution temperature is encouraged to allow the polymer to form a concentrated phase. Some earlier articles explain the general principles of which we are aware are: "A Low-Energy Solvent Separation Method," by T. G. Gutowski et al. in *Polymer Engineering and Science*, March 1983, Vol. 23, No. 4, pp. 230-237; "Lower Critical Solution Temperature Behavior of Ethylene Propylene Copolymers in Multicomponent Solvents" by C. A. Irani et al. in *Journal of Applied Polymer Science* 1986, Vol. 31, pp. 1879-1899; "Separating Polymer Solutions with Supercritical Fluids," by Mark A. McHugh et al. in *Macromolecules* 1985, Vol. 18, Issue 4, pp. 674-680; "Critical dynamics and phase-separation kinetics in dynamically asymmetric binary fluids: New dynamic universality class for polymer mixtures or dynamic crossover?," by Hajime Tanaka in *The Journal of Chemical Physics* 1 Apr. 1994, Vol. 100, Issue 7, pp. 5323-5337; "Short Chain Branching Effect on the Cloud Point Pressures of Ethylene Copolymers in Subcritical and Supercritical Propane," by S. J. Han et al. in *Macromolecules* 1998, Vol. 31, pp. 2533-2538, each of which is incorprated herein by reference.

U.S. Pat. Nos. 6,881,800 and 7,163,989, both of which incorporated herein by reference, describe a process and apparatus for the continuous solution polymerization of olefins including ethylene, propylene and other olefin comonomers. The polymerization reaction takes place under pressure in one or more polymerization reactors, and then the effluent from the reactor or reactors is treated with a catalyst killer and then heated in one or more heat exchangers before being subject to a pressure drop which causes the effluent to phase separate into a polymer-rich phase and a polymer-lean phase. Those phases are separated, with the polymer-lean phase being purified and recycled to be used as solvent. The polymer-rich phase is subject to further separation and purification stages, including passage through a vacuum devolatilizer. Following the vacuum devolatilization, the polymer is formed into pellets and/or bales for storage or shipping. The process is suitable for the manufacture of a range of different polymer types.

While the single site, metallocene catalysts have a high activity; that activity is often sustained under conditions in which phase separation would occur at elevated temperatures. Continued polymerization activity during phase separation may influence polymer characteristics undesirably.

Many types of catalyst are known for olefin polymerization, including Ziegler-Natta, chromium catalysts and single site catalysts such as metallocenes.

For the purposes of this patent specification the term "metallocene" is herein defined to contain one or more cyclopentadienyl moiety in combination with a transition metal of the Periodic Table of Elements.

The use of single site catalysts is associated with poor solubility in the aliphatic hydrocarbon, saturated, non-polar solvents used for homogeneous solution polymerization.

As a result, an aromatic catalyst solvent, such as toluene may have to be used. This in turn can complicate solvent separation to prevent toluene build up in the reactor, and lead to environmental pollution and added maintenance expenditure.

In some solution processes (see WO 98/02471 Kolthammer), incorprated herein by reference, the polymerized mixture is flashed off in two stages, whereby the solvent and unreacted monomer are converted to a vapor phase. Efficient extraction of solvent, etc., requires low vapor pressures and vapor phase compression or condensation followed by pumping for subsequent separation stages. Pumping is used to convey polymer from flash separation stages to a final devolatilizing extruder.

U.S. Pat. No. 3,912,698, incorprated herein by reference, uses a heat exchanger for a liquid recycle stream to permit an increase in reactor capacity while reducing fouling in the context of a multiple flash to remove volatiles.

The use of single site catalysts is also associated with the generation of hydrogen through beta-hydride abstraction. Such hydrogen, when recycled back to reactor feed, can act as a modifier to reduce the molecular weight of the polymer. The amount of hydrogen established in polymerization may have to be increased or decreased depending on the target molecular weight.

In some continuous solution polymerization processes, especially those processes in which the polymerization reaction is carried out under adiabatic conditions, the feed is cooled before it is supplied to the reactor or reactors, thereby increasing the amount of heat energy generated by the polymerization reaction which can be absorbed by the reaction mixture without overheating. Cooling of the feed requires both a significant amount of investment in equipment and an energy cost while operating. There remains a need for improved apparatus and processes for cooling the feed.

In some continuous solution polymerization processes, two reactors are used. For some products, such as ethylene-propylene-diene-monomer (EPDM) polymers, the reactor may be operated in series. For other products, for example, propylene-ethylene copolymers such as are described in EP 1003814, incorporated herein by reference, it is preferable to have two reactors operating in parallel. There remains a need for improved reactor systems to allow more efficient production of such polymers.

In continuous solution polymerization processes, the reactor effluent is typically subjected to one or more separation steps in which solvent, residual monomer and other volatiles such as hydrogen are stripped from the polymer. Generally, the solvent and monomer are recycled, with some heavy components such as toluene (introduced as catalyst solvent) and some light end contaminants such as hydrogen and butane being permanently removed, for example, by being sent to a flare. The recycled solvent stream may contain a small amount of polymer, say, less than 0.1 wt %, which can foul the solvent driers, heat exchangers and other equipment through which the recycled solvent passes. There remains a need for improved plant and processes for reducing or mitigating the effects of such fouling.

There remains a need for an improved continuous solution process and plant which provides one or more of the following benefits: producing polymer economically across a broad range of operating windows including varying polymerization temperatures; producing a broad spectrum of polymers, particularly polymers of widely varying average molecular weights, molecular weight distributions, and/or comonomer contents; permitting the production of polymers having useful molecular weights at high temperatures (above 150° C.); accommodating a broad range of catalyst performance; reducing energy consumption, especially in finishing, and reducing environmental discharge; and reducing or avoiding fouling in the recycle and purification systems while using highly active metallocene type catalysts with unreacted monomer and temperature during separation processes.

For additional background, see also WO 94/00500 and WO 92/14766, each of which is incorporated herein by reference.

SUMMARY OF INVENTION

Described herein in one aspect is a plant for the continuous solution polymerization of one or more monomers in a solvent e.g., a hydrocarbon solvent. In one aspect, the plant comprises a high pressure pump and at least one heat exchanger downstream of the pump. In another aspect a feed is cooled by three heat exchangers which are refrigerated by means of a common three stage compressor. In another aspect, the plant comprises a primary reactor and a secondary reactor arranged to operate in parallel, in which the ratio of volume of the primary reactor to the secondary reactor is in the range of 60:40 to 95:5. In another aspect, a method of defouling a heat exchanger is provided in which the level of liquid refrigerant in the heat exchanger is temporarily lowered.

DESCRIPTION OF THE DRAWINGS

FIGS. 5a-c also show a schematic view of the layout of tubes in a 4-pass heat exchanger which can be defouled in accordance with the method.

DETAILED DESCRIPTION OF THE ILLUSTRATIVE EMBODIMENTS

Figure 1:
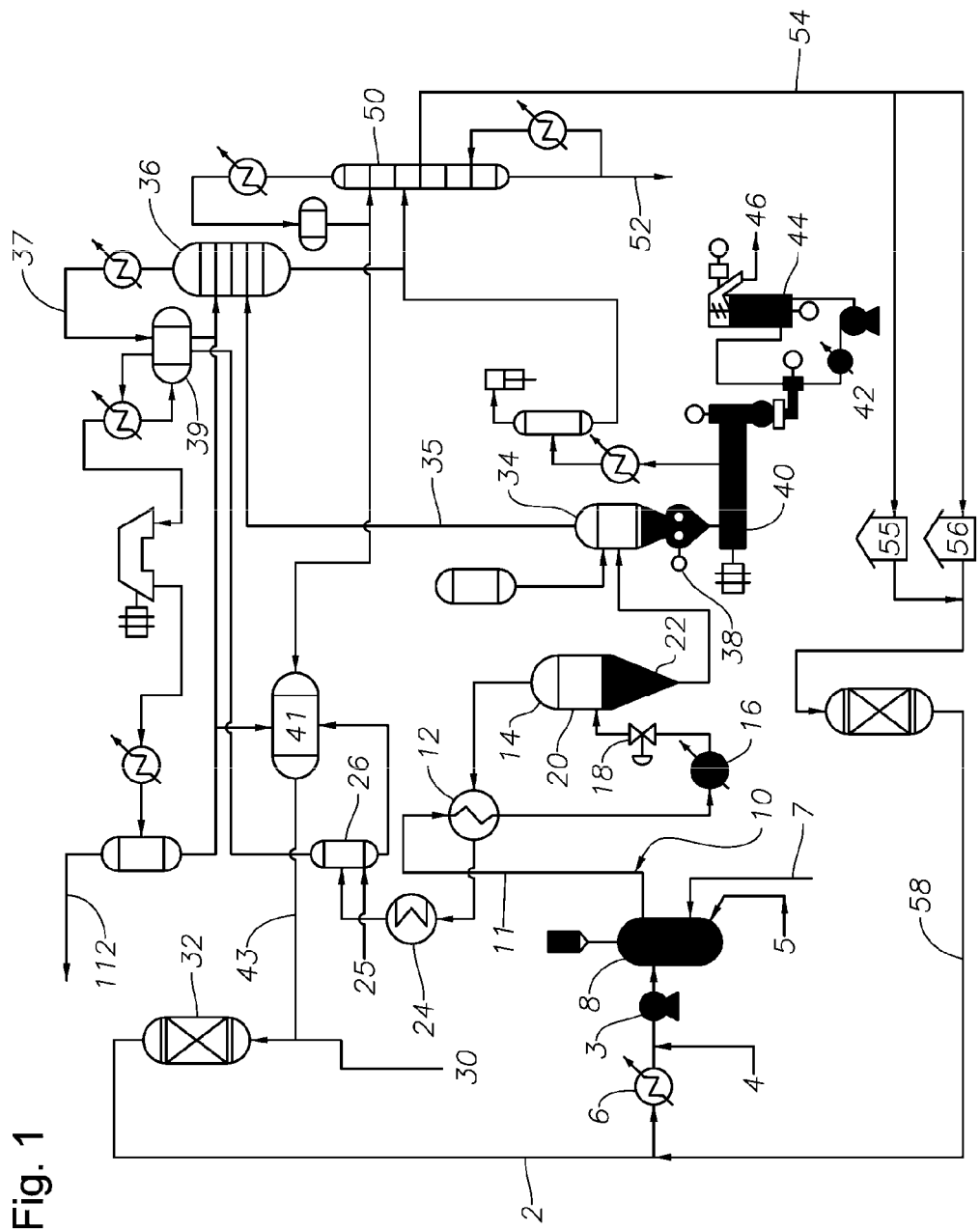
FIG. 1 shows a schematic lay-out of a plant and a process flow of a known olefin polymerization process.

In a first aspect of the invention(s) described herein is a plant for the continuous solution polymerization of a feed comprising one or more olefin monomers and a solvent, the plant comprising: a reactor, blending means to blend one or more olefin monomers and a solvent e.g., hydrocarbon solvent, to produce a feed for the reactor, a pump for compressing the feed to a pressure of at least 20 bar, preferably at least 50 bar, preferably at least 75 bar, optionally at least 100 bar, and a cooling system for cooling the feed prior to entry into the reactor comprising at least two heat exchangers wherein at least one of the heat exchangers is downstream of the pump.

The heat exchangers are optionally cooled with cooling water and are connected to a supply of cooling water. Optionally, at least one of the heat exchangers is refrigerated. Optionally, at least one heat exchanger downstream of the pump is refrigerated. Optionally, each of the heat exchangers for cooling the feed is refrigerated.

The solvent is a conventional hydrocarbon solvent or a conventional non-hydrocarbon solvent. Preferably, the solvent is a hydrocarbon solvent. More preferably, the solvent is isohexane or mixed hexanes. Still more preferably, the solvent is isohexane.

In a second aspect, provided is a continuous solution polymerization process in which a feed comprising one or more olefin monomers and a solvent is pressurized by a pump to a pressure of at least 20 bar, preferably at least 50 bar, preferably at least 75 bar, optionally at least 100 bar and is then cooled in at least one heat exchanger located downstream of the pump, prior to being polymerized in a reactor downstream of the at least one heat exchanger. In one embodiment, the feed is cooled by at least one refrigerated heat exchanger down to a temperature below −10° C., and is then pressurized by a pump to a pressure of at least 20 bar, preferably at least 75 bar, is then further cooled in a further refrigerated heat exchanger, optionally to a temperature of from −10° C. to −42° C., optionally from −10° C. to −40° C., optionally from −10° C. to −35° C., prior to being polymerized in a reactor downstream of the further refrigerated heat exchanger.

In known plants and processes for continuous solution polymerization of olefins the optionally refrigerated heat exchangers, (refrigerated heat exchangers are also known as chillers), are all upstream of the pump. In the plant and process according to the first and second aspects of the invention(s) described herein, at least the final heat exchanger is downstream of the pump. Advantageously, one heat exchanger is downstream of the pump and the other heat exchanger(s) is or are upstream of the pump.

In the plant and process according to the first and second aspects the pump is upstream of at least the final heat exchanger and therefore the temperature rise caused by the action of the pump on the feed, which may be in the region of 3° C. or more, can be countered by the refrigerated heat exchanger downstream of the pump. For example, using propylene as a refrigerant, the lowest temperature which can be reached in a refrigerated heat exchanger without reducing the pressure of the propylene below atmospheric pressure is about −41.7° C. In an arrangement where the pump is downstream of the final refrigerated heat exchanger the lowest practicable feed temperature at the reactor inlet would therefore be about −38° C. to −39° C., assuming that the pump raised the feed temperature by about 3° C. In the plant and apparatus however, the final heat exchanger is downstream of the pump, and so can reduce the temperature of the feed going into the reactor to a yet lower temperature, say −41° C., thereby allowing an increase in polymer production in the reactor.

In one embodiment, at least one of the heat exchangers is cooled with cooling water. Cooling with ordinary cooling water is the least expensive method of achieving reactor feed cooling, meaning the cooling of the solvent or the monomers or a combination of monomer and solvent, before being cooled to further lower temperatures using refrigerated heat exchangers.

In yet another embodiment, at least one of the heat exchangers is a fin-fan cooler wherein the reactor feed, meaning the solvent or the monomers or a combination of monomer and solvent, exchanges heat with ambient air that is forced over a bank or more of finned tubes. This method is especially useful when cooling water is scarce or the humidity is so high as to make cooling towers substantially ineffective.

In one embodiment, the at least one heat exchanger downstream of the pump is cooled with cooling water or air. In that embodiment, the location of the at least one heat exchanger downstream of the pump enables the feed to be cooled to a temperature approaching that of the cooling water or air.

In one embodiment, the cooling system for cooling the feed comprises three refrigerated heat exchangers, one of which is downstream of the high pressure pump.

The heat exchanger(s) downstream of the pump will be capable of operating at the pressures of the feed downstream of the pump, for example, they are capable of operating at pressures of 75 bar or more, optionally 80 bar or more, preferably 90 bar or more, more preferably 95 bar or more, and in some cases 120 bar or more.

The at least one refrigerated heat exchanger downstream of the pump is optionally a tube-in-shell heat exchanger in which the tubes optionally have an outer diameter of ¾ inch (1.91 cm). The feed will flow though the tubes, which are by virtue of their relatively narrow diameter, and thick walls, better adapted to handle high pressures than 1 inch (2.54 cm) tubes. Standard tubes are available with various wall thicknesses for any given tube outer diameter, the choice of wall thickness being commensurate with the pressure that the tube needs to withstand.

The pump may be any pump or compressor or combination of pumps and compressors suitable for compressing the feed to the required pressure. The pump may be a combination of one or more pumps, and where there is more than one pump the references herein to the pump should be understood to refer to the most downstream of the pumps before the reactor, unless another meaning is clear from the context. In one embodiment, the pump is a multi-stage centrifugal pump.

Optionally, the process is an adiabatic continuous solution process. Optionally, the pump raises the feed to a pressure of 80 bar or more, optionally 90 bar or more, preferably 95 bar or more, and in some cases 120 bar or more.

Optionally, the at least one heat exchanger downstream of the pump reduces the temperature of the feed to a temperature in the range of from 50° C. to 20° C., preferably in the range of from 30° C. to 0° C., more preferably in the range of from 0° C. to −30° C., and in some cases more preferably from −38° C. to −41° C. In the case where the heat exchanger is refrigerated any suitable refrigerant may be used. Optionally, the refrigerant is propylene and is supplied to the refrigerated heat exchangers by a multi-stage compressor.

Optionally, the feed increases in temperature by at least 1° C., optionally at least 2° C., optionally at least 3° C., and in some cases at least 10° C. as it passes through the pump.

In one embodiment, the plant has two reactors, a primary reactor and a secondary reactor arranged to operate in series or in parallel. Optionally, the feed supply to each reactor has its own pump and includes at least one optionally refrigerated heat exchanger located downstream of the respective pump. In one embodiment, the feed supply to one reactor has a cooling water cooled heat exchanger located upstream of the pump while the feed supply to the second reactor has a cooling water cooled heat exchanger located downstream of the pump. In one embodiment, the cooling system for the feed to one reactor has a cooling water cooled heat exchanger and a refrigerated heat exchanger located downstream of the pump and the cooling system for the other reactor has only a cooling water cooled heat exchanger located upstream of the pump, i.e. with no heat exchanger downstream of the pump.

In one embodiment, the plant comprises a) a primary reactor and a primary feed line for supplying a primary feed to the primary reactor comprising a first pump for compressing the primary feed to at least 75 bar, first and second refrigerated heat exchangers arranged upstream of the first pump and downstream of the feed blending means, and a third refrigerated heat exchanger located downstream of the first pump and upstream of the primary reactor; and b) a secondary reactor and a secondary feed line for supplying a secondary feed to a secondary reactor comprising a second pump for compressing the secondary feed to a pressure of at least 75 bar, a fourth refrigerated heat exchanger located upstream of the second pump and downstream of the feed blending means, and a fifth refrigerated heat exchanger located downstream of the second pump and upstream of the secondary reactor.

In another embodiment, the plant comprises a common first pump for raising the pressure of a mixture of solvent and recycle solvent with residual dissolved monomers to a pressure of about 25 bar or more followed by a water cooled heat exchanger to cool this mixture to a temperature of 45° C. or lower and then followed by a bed containing dessicants to remove any moisture or other catalyst poisons. The stream is then split into a first stream destined for the primary reactor and a second stream destined for the secondary reactor. Means are provided for mixing additional monomers at the requisite proportion to each reactor into their respective stream of solvents to give a first feed and a second feed. The first feed for the primary reactor is further pumped up to a pressure adequate to enter the primary reactor, for example of 120 bar or more, which may result in a temperature rise of approximately 15° C., for example from 39° C. to 55° C. and is then cooled first with a cooling water exchanger to a temperature of no more than 45° C., preferably no more than 40° C. and then further cooled with a refrigerated heat exchanger to a temperature of no more than 35° C., preferably no more than 30° C., and more preferably no more than 20° C. prior to entry into the primary reactor. The second feed for the secondary reactor is first cooled in a heat exchanger with cooling water as the coolant to a temperature of no more than 40° C., preferably no more than 30° C., and is then boosted to the requisite pressure to enter the reactor, for example 120 bar or more, which step may result in warming of the feed by about 5° C. to a temperature in the range of from 40° C. to 45° C. The choice of arranging the heat exchanger before the pump enables the second feed to contain a higher concentration of light hydrocarbon monomers, which may otherwise have a combined vapor pressure above the bubble point, which would be detrimental to the operation of the reactor feed pump.

In a third aspect, provided is a plant for the continuous solution polymerization of a feed comprising one or more olefin monomers and a solvent, the plant comprising: a reactor, blending means to blend one or more olefin monomers with a solvent to provide a feed for the reactor, one or more pumps for pumping the feed to the reactor and for compressing the feed to the desired polymerization pressure, and a cooling apparatus for cooling the feed downstream of the blending means and prior to entry into the reactor comprising: a first heat exchanger, a second heat exchanger and a third heat exchanger, a common three-stage compressor having an outlet which communicates with an accumulator drum via a condenser, a first suction port which optionally communicates with a first suction drum, a second suction port which optionally communicates with a second suction drum, and a third suction port which optionally communicates with a third suction drum, and conduits for the supply of refrigerant from the accumulator drum to the first heat exchanger and conduits for return of refrigerant from the first heat exchanger to the first suction port or first suction drum, if present, conduits for the supply of refrigerant from the first suction port or first suction drum, if present, to the second heat exchanger and conduits for the return of refrigerant from the second heat exchanger to the second suction port or second suction drum, if present, and conduits for the supply of refrigerant from the second suction port or second suction drum, if present, to the third heat exchanger and conduits for return of refrigerant from the third heat exchanger to the third suction port or third suction drum, if present.

In a fourth aspect, provided is a continuous solution polymerization process comprising preparing a feed comprising one or more olefin monomers and a solvent, passing the feed through a first heat exchanger, a second heat exchanger and a third heat exchanger, each of the first, second and third heat exchangers being supplied with a refrigerant by a common three-stage compressor, the refrigerant supply to the third heat exchanger being at a temperature of less than −30° C., combining the feed with a catalyst to produce a polymer, and separating the polymer from the solvent and residual monomer.

The plant and process of the third and fourth aspects involves supply of the refrigerant from a three stage compressor to first, second and third heat exchangers which cool a feed for the continuous solution polymerization reaction. The inventors have found that using three stages of compression provides an efficient and effective plant and process having reduced operating costs whilst avoiding undue complexity.

Optionally, the three stage compressor also supplies refrigerant to other heat exchangers in the plant, for example, a heat exchanger for cooling pelletization water, or for cooling air in a fluid bed drier or a pneumatic conveyor.

Optionally, each of the first, second and third heat exchangers comprises a plurality of tubes through which the feed passes and which are arranged in a shell for containing the refrigerant.

Optionally, the first and second heat exchangers have tubes of outer diameter of 1 inch (25.4 mm). Optionally, the third heat exchanger has tubes of outer diameter of ¾ inch (19.1 mm). Optionally, the first and second heat exchangers are four-pass kettle heat exchangers. Optionally, the first, second and third heat exchangers are each provided with a three-way control valve which allows at least a potion of the feed to bypass the respective heat exchanger. Optionally, the plant also comprises a secondary reactor and the cooling apparatus comprises fourth and fifth heat exchangers which are arranged to cool the feed to the secondary reactor, the cooling apparatus further comprising conduits for the supply of refrigerant from the first suction port or first suction drum, if present, to the fourth heat exchanger and conduits for return of the refrigerant to the second suction port or second suction drum, if present, and conduits for the supply of refrigerant from the second suction port or second suction drum, if present, to the fifth heat exchanger and conduits for the return of refrigerant from the fifth heat exchanger to the third suction port or third suction drum, if present.

Optionally, the plant comprises a secondary pump for compressing the feed to the secondary reactor to a pressure of at least 20 bar, optionally at least 75 bar and optionally the secondary pump is located between the fourth and fifth heat exchangers. Optionally, a pump for compressing the feed to a pressure of at least 20 bar, optionally at least 75 bar is located between the second and third heat exchangers.

Any suitable refrigerant may be used. In a favored embodiment, the cooling apparatus contains propylene as refrigerant. Optionally, the refrigerant in the accumulator drum is at a pressure in the range of from 10 to 25 barg. Preferably, the first, second and third suction drums are present. Optionally, the refrigerant in the first suction port or drum, if present, is at a pressure in the range of from 4 to 8 barg. Optionally, the refrigerant in the second suction port or drum, if present, is at a pressure of from 1 barg to 4 barg. Optionally, the refrigerant in the third suction port or drum, if present, is at a pressure of from 1.1 barg to 2 barg. Optionally, the continuous solution polymerization is a continuous adiabatic solution polymerization.

In a fifth aspect, provided is a plant for the continuous solution polymerization of one or more olefin monomers, the plant comprising: a primary reactor and a secondary reactor arranged to operate in parallel, the ratio of the internal volume of the primary reactor to the internal volume of the secondary reactor being in the range of from 60:40 to 95:5, primary feed supply means for supplying a primary feed comprising one or more olefin monomers in a solvent, to the primary reactor, and one or more primary catalyst supply apparatus for supplying a polymerization catalyst to the primary reactor, to form a primary polymer-containing polymerization reaction mixture therein; secondary feed supply means for supplying a secondary feed comprising one or more olefin monomers in a solvent to the secondary reactor, and a secondary catalyst supply apparatus for supplying a secondary polymerization catalyst to the secondary reactor, to form a secondary polymer-containing polymerization reaction mixture therein; means to combine the primary and secondary polymer-containing polymerization reaction mixtures downstream of the primary and secondary reactors to form a combined polymerization reaction mixture, and means to isolate the polymer from the combined polymerization reaction mixture.

In a sixth aspect, provided is a process for the continuous solution polymerization of olefin monomers comprising: supplying to a primary reactor a primary feed comprising one or more olefin monomers in a solvent, and primary catalyst, thereby forming a primary polymer-containing polymerization reaction mixture, supplying to a secondary reactor a secondary feed comprising one or more olefin monomers in a solvent, and a secondary catalyst thereby forming a secondary polymer-containing polymerization reaction mixture, combining the primary and secondary polymer-containing polymerization reaction mixtures downstream of the primary and secondary reactors to form a combined polymer-containing polymerization mixture, and isolating the polymer from the combined polymer-containing polymerization reaction mixture, in which the ratio of the internal volume of the primary reactor to the internal volume of the secondary reactor is in the range of from 60:40 to 95:5, optionally from 65:35 to 90:10, optionally from 70:30 to 90:10.

In conventional plants designed to operate primarily with two reactors in series, it has been conventional to use reactors of equal size. However, when used in parallel configuration to make a blend of two different polymers having a major component and a minor component, such as 90:10 blend, it has been found that the residence time of the reaction in the secondary reactor has to be relatively long, which makes that reactor difficult to control and sluggish to respond to changes in conditions. In contrast, the provided herein in the fifth and sixth aspects a reactor arrangement in which one reactor (the primary reactor) is larger than the other (the secondary reactor). That arrangement has the advantage that when used as parallel reactors for preparing, say, a 90:10 by weight blend of two different copolymers, the minor component can be prepared in the secondary reactor and the residence time of the reaction in the secondary reactor may be maintained at a manageable level. For example, the residence time in the primary reactor may be about 10 minutes and in the secondary reactor 30 minutes, whereas for equal sized reactors the residence times would be about 10 and 90 minutes respectively, which would make control of the secondary reactor difficult. Furthermore, the small size of the secondary reactor allows a reduction in the cost of building the plant, whilst the larger primary reactor is available for making single component polymer products.

Optionally, the ratio of the volume of the primary reactor to the volume of the secondary reactor is in the range of from 65:35 to 90:10, optionally from 70:30 to 90:10. Optionally, the plant is suitable for the continuous adiabatic solution polymerization of olefin monomers. Optionally, the primary and secondary reactors are continuous stirred tank reactors. Optionally, the residence time of the primary polymer-containing polymerization reaction mixture in the primary reactor is in the range of from 3 minutes to 90 minutes, for example, in the range of from 3 minutes to 30 minutes. Optionally, the residence time of the secondary polymer-containing polymerization reaction mixture in the secondary reactor is in the range of from 3 minutes to 90 minutes, for example, in the range of from 5 to 30 minutes. Optionally, the continuous solution polymerization is carried out under adiabatic conditions. Optionally, the polymer isolated from the combined polymer-containing polymerization mixture is a polymer having a Shore A hardness of no more than 60, optionally no more than 50. Optionally, the polymer isolated from the combined polymer-containing polymerization mixture is a polymer having a Vicat A softening point of no more than 60° C., optionally no more than 40° C., optionally no more than 30° C.

The plant of the fifth aspect may be used to make one-component polymers using one of the reactors only. For example, the plant of the fifth aspect can be used in a process in which only a single reactor is used and the feed comprises a mixture of ethylene and butene and the catalyst is a chiral metallocene catalyst such that in the reactor is formed a co-polymer of ethylene and butene having a density of from about 0.85 to about 0.91 from ethylene sequences, and a butene content of from about 10 wt % to 50 wt %. Preferably, however, it is used to make two-component polymer blends. The reactors may be used in series or parallel, preferably in parallel. The polymer blend may, for example, be a blend as described in EP 1 003 814, incorprated herein by reference.

In one embodiment, the primary feed comprises a mixture of ethylene and propylene and the secondary catalyst is a chiral metallocene catalyst such that in the primary reactor is formed a co-polymer of ethylene and propylene having crystallinity of from about 2% to about 65% from isotactic polypropylene sequences, a propylene content of from about 75 wt % to 90 wt % and a melting point of 25° C. to 105° C., and the secondary feed comprises propylene or a mixture of propylene and one or more monomers selected from a group consisting of C2 or C4 to C10 alpha-olefins and the secondary polymer-containing polymerization reaction mixture comprises a substantially isotactic polypropylene polymer containing at least about 90 wt % polymerized propylene and a melting point greater than about 110° C. Such polymer blends are used in the Vistamaxx™ range of products available from ExxonMobil.

Optionally, the ratio of polymer production rate in the primary reactor to polymer production rate in the secondary reactor is in the range of from 60:40 to 95:5, optionally from 65:35 to 90:10, optionally from 70:30 to 90:10.

In a seventh aspect, provided is a plant for the continuous solution polymerization of a feed comprising one or more olefin monomers and a solvent, the plant comprising: a reactor, feed blending means to prepare a feed comprising one or more olefin monomers in a solvent, and means to supply to the reactor the feed and a catalyst to form therein a polymer-containing reactor mixture, downstream of the reactor, separation means for separating the polymer from the unreacted monomer and the solvent, and recycling apparatus for recycling the solvent back through the feed blending means and to the reactor including at least one heat exchanger having an upper array of horizontally-arranged tubes and a lower array of horizontally-arranged tubes arranged below the upper array, both the upper and lower arrays being enclosed in a shell having an inlet and an outlet for a liquid refrigerant, and in which the solvent flows first through the upper array of tubes and then through the lower array of tubes, the inlet being provided with a valve for reducing or preventing the flow of refrigerant into the shell such that, in use, the level of refrigerant in the shell may be lowered to expose the upper array of the tubes.

In an eighth aspect, provided is a method of de-fouling a heat exchanger in a plant for the continuous solution polymerization of one or more olefin monomers in which a feed comprising one or more olefin monomers in a solvent, is polymerized to provide a polymer-containing polymerization reactor mixture from which the solvent and residual monomer are separated, the solvent being recycled through a recycling apparatus which includes a heat exchanger to cool it prior to re-use, in which the heat exchanger has an upper horizontally-arranged array of tubes and a lower horizontally-arranged array of tubes enclosed in a shell containing liquid refrigerant and the solvent passes first through the upper array of tubes and then through the lower array of tubes, the method including the steps of passing the solvent through the upper and lower arrays of tubes of the heat exchanger with a liquid refrigerant in the shell covering both the upper and lower arrays of tubes and, when it is desired to de-foul the heat exchanger, lowering the level of liquid refrigerant in the shell to expose the upper array of tubes such that the temperature of the solvent in the upper array of tubes increases.

In plants and processes for the continuous solution polymerization of olefins, the solvent and residual monomer is typically recycled back to the start of the process through a variety of purification and processing apparatus which includes at least one heat exchanger for reducing the temperature of the recycle fluid. However, the solvent, which typically comprises a small amount of residual monomer, also often includes a small amount, for example, less than 0.1 wt % of polymer. The polymer may be present for a variety of reasons. In plants having a liquid phase separator in which the effluent from the reactor is separated into two liquid phases, the polymer-lean phase is typically recycled back to the start of the process. That polymer-lean phase typically comprises a small amount of polymer as mentioned above. In plants in which the separation is carried out using a series of flash vessels so that the solvent and the residual monomer are drawn off as a vapor phase, high flash drum velocities can result in trace amounts of polymer entering the recycled solvent. That trace of polymer present in the recycle stream can cause fouling of equipment in the recycling apparatus. For example, the recycling apparatus will typically comprise one or more drier beds for purification of the recycle stream and those drier beds can become fouled by residual polymer. Fouling also arises in refrigerated heat exchangers which are used to cool the recycle solvent and the feed prior to entry of the feed into the reactor arrangement. In the plant and process of the seventh and eighth aspects, the heat exchanger fouling is dealt with by using a heat exchanger having an upper array of horizontally-arranged tubes and a lower array of horizontally-arranged tubes arranged below the upper array with the recycle stream of solvent (and optionally residual monomer) passing first through the upper array and into the lower array. As the recycle stream passes first through the upper array, fouling by traces of polymer present in the recycle solvent will occur preferentially in the upper array of tubes. When it is desired to defoul the heat exchanger, for example, because of the pressure drop across the heat exchanger rises to a predetermined level, the supply of refrigerant to the shell is reduced or cut off entirely so that the level of refrigerant in the shell decreases to expose the upper array of tubes. That upper array of tubes is then no longer cooled so efficiently by the refrigerant and in consequence the temperature of the upper array of tubes and the liquid therein rises. That rise in temperature causes the polymer deposited in those tubes to re-dissolve in the recycle solvent thereby defouling the heat exchanger. Once the fouling has been substantially or entirely eliminated the supply of the refrigerant into the shell can be returned to its normal level such that the upper array of tubes is once more submerged in refrigerant and the efficiency of the heat exchanger is restored.

During the temporary reduction of refrigerant level in the shell of the heat exchanger, the level of the refrigerant will typically be reduced by the maximum amount possible without unduly causing an unacceptable rise in the temperature of the feed entering the reactor arrangement. It may therefore be possible for the level of refrigerant to fall below some or all of the lower array of tubes also.

When the heat exchanger is being defouled, the temperature of the solvent passing through the heat exchanger will rise above its normal level, which may cause a rise in the temperature of any downstream dryer or purification beds. For example, the purification beds may rise in temperature by around 5° C. to 30° C., thereby also causing polymer fouling those beds to dissolve also. In that way, the purification beds may also be defouled at the same time as the heat exchanger.

The heat exchanger may be of any suitable configuration. The tubes may pass straight through the shell, that is, they may enter at one end of the shell and extend through the entire length of the shell, exiting the shell at the other end. However, in a preferred embodiment the tubes are U-tubes having an entry and an exit at the same end of the shell. In a preferred embodiment, the heat exchanger is a four-pass heat exchanger, that is, the recycle liquid comprising solvent (and optionally residual monomer) travels along the length of the shell four times. For example, when the heat exchanger is four-pass U-tube heat exchanger, the recycle liquid will enter the upper array of tubes and travel down the U-tubes in one direction and that back again and will then flow into the lower array of tubes and travel once more down the length of the U-tubes and back again.

The tubes of the heat exchanger optionally have an outer diameter of approximately 1 inch (25.4 mm), for example, in the range of from 22 to 28 mm. Alternatively, the tubes of the heat exchanger optionally have an outer diameter of ¾ inch (19.05 mm), for example, in the range of from 17 to 21 mm. 1 inch tubes are less economical in capital investment, or heat transfer efficiency, or operating cost as compared to ¾ inch tubes and are therefore typically used only when the liquid flowing through the tubes is prone to cause fouling.

The refrigerant may be any suitable refrigerant. Optionally, the refrigerant is propylene.

The level of the liquid refrigerant in the heat exchanger shell is optionally lowered by closing an inlet of liquid refrigerant into the shell and allowing the liquid refrigerant in the shell to boil off. As mentioned above, the level of liquid refrigerant is optionally reduced until the temperature of the feed entering the reactor or reactors reaches a certain predetermined limit. Optionally, the level of liquid refrigerant in the shell is lowered to expose both the upper and the lower array of tubes as mentioned above. The lowering of liquid refrigerant in the shell is temporary.

In the context of the seventh and eighth aspects, the recycling apparatus for recycling the solvent back through the feed blending means into the reactor or reactors includes all of the apparatus through which the recycle solvent passes, including the feed blending means and the heat exchangers for cooling the feed prior to entry into the reactor. The apparatus may contain a heat exchanger upstream of the feed blending means as well as one or more heat exchangers downstream of the feed blending means and upstream of the reactor. Preferably, the heat exchanger upstream of the heat blending means has an upper array of horizontally-arranged tubes and a lower array of horizontally-arranged tubes arranged below upper array, both the upper array and the lower array being enclosed in a shell having an inlet and outlet for a liquid refrigerant and in which the solvent flows first through the upper array tubes and then through the lower array of tubes, the inlet being provided with a valve for reducing or preventing the flow of refrigerant into the shell such that, in use, the level of the refrigerant in the shell may be lowered to expose the upper of tubes.

Optionally, one or more of the heat exchangers downstream of the feed blending means is also provided with an upper array of horizontally-arranged tubes and a lower array of horizontally-arranged tubes arranged below the upper array, both the upper and lower arrays being enclosed in a shell having an inlet and an outlet for a liquid refrigerant and in which the solvent flows first through the upper array of tubes and then through the lower array of tubes, the inlet being provided with a valve for reducing or preventing the flow refrigerant into the shell such that, in use, the level of refrigerant in the shell may be lowered to expose the upper array of tubes.

Optionally, the method of the eighth aspect is practiced on a heat exchanger upstream of the feed blending means. Optionally, the method of the eighth aspect is practiced on one or more of the heat exchangers downstream of the feed blending means. Optionally, the solvent is cooled by the heat exchanger to a temperature of between −39° C. and 20° C. during the periods when both the upper and lower arrays of tubes are covered by liquid refrigerant, that is, during normal operation of the heat exchanger.

Optionally, the plant of the seventh aspect comprises a pressure let-down device capable of reducing the pressure of the polymer containing reaction mixture to a pressure at which the mixture separates into a polymer-rich phase and a polymer-lean liquid phase and further comprises means for separating the polymer-lean liquid phase from the polymer-rich phase such that the polymer-lean liquid phase can be recycled as a recycle stream to the recycling apparatus.

Optionally, in the method of the eighth aspect, the polymer containing polymerization reaction mixture is separated into a polymer-rich liquid phase and a polymer-lean liquid phase and the polymer-lean liquid phase is recycled through the recycling apparatus.

The plant and processes of all aspects may involve more than one reactor. Where the plant does include more than one reactor, it is, of course, possible to use only one of the reactors to make a single reactor grade and leave the other reactor or reactors unused. In one embodiment applicable to all aspects except the sixth, only a single reactor is used and the feed comprises a mixture of ethylene and butene and the catalyst is a chiral metallocene catalyst such that in the reactor is formed a co-polymer of ethylene and butene having a density of from about 0.85 g/cm$^3$ to about 0.91 g/cm$^3$ from ethylene sequences, and a butene content of from about 10 wt % to 50 wt %.

It will be appreciated that the aspects mentioned above may be practiced separately or one or more aspects may be practiced together. The optional and preferred features of each aspect will also be optional aspects of the other aspects The polymer produced in the plant and process all aspects is typically a polyolefin. Optionally, the polymer contains a total of at least 50 mol % of units derived from ethylene or propylene out of the total units present in the polymer. Optionally, the polymer is a polymer having a Shore A hardness of less than 60, optionally, less than 50. Optionally, the polymer is a polymer having a Vicat A softening point of no more than 60° C., optionally no more than 40° C., optionally no more than 30° C. References herein to the Vicat softening point means as measured by ASTM D 1525 Loading 1 (10N) and Rate B (120 C./h). The polymer may be an ethylene elastomer product as defined herein.

"Ethylene Elastomer Products" shall mean random copolymers produced in a solution metallocene reactor containing (a) ethylene and propylene and optionally diene, (b) ethylene and n-butene, or (c) ethylene and octene, within the following limits:

(i) for (a), ethylene content of at least 35 wt %, propylene content of 20 wt % to 65 wt %, and optionally diene content of 1 wt % to 10 wt %; or (ii) for (b), ethylene content of at least 50 wt % and n-butene content of greater than 10 wt % and with a polymer density of less than 0.905 grams per cubic centimeter (g/cm$^3$); or (iii) for (c), ethylene content of at least 50 wt % and octene content of greater than 15 wt % and with a polymer density of less than 0.905 grams per cubic centimeter (g/cm$^3$).

Materials such as anti-oxidants and processing aids which have been added in the recovery and finishing steps and which remain in the final product after finishing shall be considered part of the Ethylene Elastomer Product.

Optionally, the polymer is a polymer blend comprising a) a first component prepared from a mixture of ethylene and propylene in the presence of a chiral metallocene catalyst and has a crystallinity of from about 2 to 65% from isotactic propylene sequences, a propylene content of from 75 wt % to 90 wt % and a melting point in the range of 25° C. to 105° C., and b) a second component prepared from a propylene or a mixture of propylene and one or more monomers selected from the group consisting of C2 or C4 to C10 alpha-olefins which is a substantially isotactic polypropylene polymer containing at least 90 wt % polymerized propylene and having a melting point of greater than 110° C. Optionally, the polymer is an EPDM or a thermoplastic elastomer.

Various aspects will now be described in more detail in the context of the a continuous solution polymerization plant having a liquid phase separator as the first separation stage downstream of the reactor. It should be understood, however, that the description of the apparatuses and processes is also applicable to plants and processes having no liquid phase separator.

The means to supply a feed of one or more olefin monomers in a solvent may be any suitable apparatus but will typically include a conduit for the supply of each of the monomers to a common feed conduit, a conduit for the supply of recycled solvent (often also containing some residual monomer), a conduit for the supply of fresh solvent and a pump or pumps for pumping the feed to the reactor or reactors, and for pressurizing the feed to the desired pressure.

The reactor arrangement in the first, second and fifth to eighth aspects may be single reactor or a plurality, preferably two, reactors arranged in series, or optionally in parallel. Each reactor is optionally a continuous stirred tank reactor.

The plant comprises one or more pumps upstream of the reactor or reactors to raise the pressure of the feed to the required level, for example, to above 75 bar or 80 bar. Optionally, the feed supply line to the or to each reactor includes a pump, for example, a centrifugal pump for raising the pressure of the solvent to the required level (optionally, the solvent contains recycled residual monomer) and separate pumps, for example diaphragm pumps, for raising the pressure of each fresh monomer to the required level, with the solvent and monomers being combined downstream of the pumps. However, preferably the monomer or monomers are combined with the solvent upstream of the pump so that the combined feed can be raised to the required pressure by a single pump, thereby avoiding the need for separate diaphragm pumps for the monomers. Optionally, the single pump is a centrifugal pump. Of course, when there are two reactors, each reactor is provided with a separate pump for raising the feed to that reactor to the required pressure. This approach has particular advantages where the ethylene supplied to the plant is at low pressure because ethylene dissolves readily in hydrocarbon solvents such as isohexane and n-hexane and therefore this method avoids the necessity for a separate pump or pumps or compressors to pump the ethylene up to the required pressure. The ethylene may be mixed into the solvent stream by any suitable means. For example, the ethylene may be sparged into a conduit carrying the solvent. The sparging may be via a single sparge outlet or is preferably via two or more sparge outlets. The sparge outlets should be placed far enough upstream of the pump, for example at least 5, preferably at least 10 meters upstream of the pump in order that the ethylene is fully dissolved before reaching the pump suction.

By optionally raising the pressure, for example, to above 20 bar, or optionally to above 75 or 80 bar when more of the lighter monomers are used the formation of two-phase conditions is avoided in the reactor or reactors under a wide range of temperature and polymerization conditions. Hence a wide variety of catalysts can be used in the process. Such a wide range of catalysts can be used to make high and/or low average molecular weight materials under optimized production conditions. In one embodiment, use of a separate pump to boost the pressure of the viscous polymerization mixture between the reactor and the liquid phase separator can be avoided, [such pumps are much more costly than the low viscosity feed pump]. The pressure of the pump also cascades through the process and combines with the absence of vaporization for the initial solvent separating stage to reduce overall pumping needs during finishing. The pressure of the pump advances the viscous polymerization mixture to the pressure reducing means upstream of the liquid phase separator without allowing phase separation prior to the pressure reducing means. In a preferred form, the pressure of the pump additionally advances one or both separated phases to further downstream fractionating systems or purification devices such as high pressure flash separation devices or low pressure flash separating devices. In an alternative embodiment, there is no liquid phase separation and isolation of the polymer is achieved by vaporization of the volatiles in flash tanks or by other means.

Preferably, a catalyst killer is added downstream of the reactor or reactors (in the case of series reactors that means that the killer is added downstream of the last polymerization reactor). Optionally, the catalyst killer is added upstream of a heating arrangement and a liquid phase separator to suppress further polymerization of the heated polymerization mixture undergoing separation, the lean phase being passed through a cooling apparatus, which may comprise a heat integrating exchanger and a final cooler, and optionally a drier back to the inlet side of the pump; the polymer-rich phase being subjected to additional solvent removal downstream to obtain a solid polymer.

The addition of the catalyst killer permits the temperature to be increased without risking further polymerization so facilitating direct recycle, after removal of any surplus killer, of separated solvent and monomer to the feed supply means on the inlet side of the pump. With term "direct" is meant that the lean phase generally does not need to be fractionated.

Some known continuous polymerization processes utilize water as a catalyst killer. However, the inventors have found that methanol also acts as a catalyst killer and it is believed to reduce the amount of downstream fouling caused by residual polymer in the solvent recycle. When methanol is used, it will be desirable to utilize a drying medium in the drying beds for the recycled solvent that is suitable for removal of methanol. For example, the drying beds may contain a 4 Å molecular sieve. The methanol is optionally injected into the polymer containing polymerization mixture effluent from the reactors in an amount of from 5 to 15 mols of methanol per combined mols of catalyst and scavenger, optionally, from 10 to 30 mols of methanol per combined mols of catalyst and scavenger. When methanol is used the drying bed may contain both the 3 Å molecular sieve to remove water and methanol, and/or the 4 Å molecular sieve to remove methanol, and an alumina such as CDO200 activated alumina for removal of other catalyst poisons.

In one embodiment, where methanol is used as a catalyst killer, the plant may contain a recycle solvent drier system comprising two separate drier beds. The first bed optionally contains a first stage comprising a 4 Å molecular sieve and a second stage comprising CDO200 alumina (available from BASF). The second bed optionally contains a first stage containing a 4 Å molecular sieve and second stage containing CD alumina. The CD alumina is more aggressive to certain olefins than CDO200, but is believed to have a greater capacity for absorption of certain oxygenated catalyst poisons. In use, the two drier beds are alternated with one bed being employed in drying the recycle solvent while the other bed is regenerated using a flow of hot nitrogen.

The flow through the driers may be upwards or downwards. Preferably, the flow of the recycle solvent through the driers is upwards because upward flow provides a more even flow distribution and improves the efficiency with which the entire bed is used.

Preferably, energy consumption per unit polymer produced is low, with simple solvent recovery and energy integration systems [such as heat integrating exchanger], which can be employed to minimize discharges to atmosphere and to recover heat from the effluent on the liquid phase separator.

The term "liquid phase separator" refers to an apparatus in which a single phase liquid mixture is exposed to conditions in which it separates into two liquid phases.

Preferably the liquid phase separator is connected to a flash tank, arranged downstream, which receives the polymer-rich phase from the liquid phase separator. Preferably a the flash tank operates at a pressure sufficient to allow feeding of the vapor phase to the fractionating and purification system without requiring a separate compressor, and said pressure is generally 2 bar gauge or more. In order to accommodate production of polymers with a wide range of molecular weights, this pressure in the flash tank can be raised to a high level, for example, between 3 and 10 barg, to adjust solution viscosity to facilitate feeding of the concentrated polymer solution to the final devolatizing stage. Thus the volatile phase removed from a concentrated phase is optionally conveyed simply to a fractionating tower as a vapor, arranged downstream of the flash tank, for purification. In some prior art arrangements where solvents, etc., are drawn off under a low pressure in the vapor phase, the extracted volatiles must be condensed and passed through pumping means for subsequent further separation steps.

In one embodiment the lean phase is passed in liquid form to a means for removing hydrogen added to or generated during polymerization, which means comprises a means for contacting a stripping vapor with the lean phase in a countercurrent flow arrangement to concentrate the hydrogen in the vapor phase for removal from the lean phase recycle.

Solvent-containing vapor streams are generated by several parts of the plant such as the flash tank and the devolatilizer. Those streams are typically brought together and condensed to give liquid solvent which is then combined with the polymer-lean phase from the liquid phase separator to give a combined solvent recycle stream. During the condensation of the vapor streams, they are typically passed through a solvent purification tower to take out toluene, which enters the system as a catalyst solvent, and heavy monomer such as octene or ENB which can be sent to recycle storage. Where heavy monomers such as octene or ENB are not being used, the plant optionally includes a condenser arranged immediately upstream of the tower to partially condense the vapor stream. For example, about 30 wt % of the vapor may be condensed to liquid. That liquid is then sent to the tower to separate the toluene and the remaining 70 wt % of vapor is not sent to the tower, thereby allowing the tower to be reduced in size as compared to plants not comprising the partial condenser.

The liquid is typically fed to the tower above the top plate.

The partial condenser is optionally a co-current condenser fed with water as the coolant. The co-current arrangement ensures the water cannot boil during unusual situations such as plant start up.

The vapor stream from the top of the solvent purification tower is optionally cooled and compressed to form a mixed vapor and liquid stream which is separated into liquid and vapor with the liquid being fed to the bottom of the light end tower and the vapor being fed to the top of the light end tower. Introducing those streams as side streams in a 5 bed tower would give more efficient separation, but introduction at the top and bottom allows a less expensive 3 bed tower to be used.

Downstream of the liquid phase separator, the polymer-rich phase enters a flash tank operating at a pressure such that solvent and residual monomer vaporizes to leave a concentrated polymer phase. The concentrated polymer phase may, for example, comprise from 70 wt % to 95 wt % of polymer with the rest being volatiles such as solvent and residual monomers. The vapor is separated as an overhead stream from the flash tank and the concentrated polymer phase typically is collected in the bottom of the flash tank from where it passes through an outlet into a conduit and eventually flows to a vacuum devolatilizer.

The plant preferably comprises a pump such as a gear pump for withdrawing the concentrated polymer phase from the flash tank and pumping it to the inlet of the devolatilizer.

The term 'vacuum devolatilizer' refers to a device in which the concentrated polymer phase is exposed to a vacuum whilst being agitated to expose new surface area, thereby causing further residual solvent and monomer to evaporate and be drawn off The level of volatiles (typically residual solvent and monomer), present in the concentrated polymer phase immediately downstream of the flash tank is optionally less than 30 wt %, preferably less than 25 wt %, and more preferably less than 15 wt %. The level of volatiles in the polymer immediately downstream of the devolatilizer is preferably no more than 0.5 wt %, preferably no more than 0.25 wt %, and more preferably no more than 0.1 wt %.

The pressure in the vacuum devolatilizer is preferably no more than 500 mmHg, preferably no more than 55 mmHg, preferably no more than 30 mmHg. The temperature is optionally in the range of from 150° C. to 270° C.

Preferably, the process uses a non-polar solvent which does not coordinate or interfere in a meaningful way so as to inhibit the catalytic action of the catalyst system. Preferably the process uses a low boiling, alkane based solvent, optionally mixtures of alkanes, which may be linear or branched, such as those having from 4 to 10 carbon atoms, preferably in the range of 5-7 carbon atoms, optionally in admixture with other alkanes of a higher or lower molecular weight. The solvent is preferably a hexane.

Some known continuous olefin polymerization processes utilize n-hexane as solvent. However, n-hexane is associated with health concerns and therefore it is preferred to use isohexane as a solvent. Isohexane has a slightly unfavorably heat capacity relative to n-hexane and therefore it is necessary to use 1 or 2% more isohexane as compared to n-hexane to remove an equivalent amount of heat of reaction.

The polymer may be derived of monomers predominantly comprising mono-olefins such as ethylene or propylene or other higher alpha-olefins having from 4 to 10 carbon atoms.

Considerable energy can be preserved by providing that the polymerization mixture from the reactor is heated to the temperature before reaching the separator successively by an upstream heat integration exchanger and a downstream trim heat exchanger and by providing that the lean phase from the separator is used to supply heat to the upstream one of said heat exchangers.

Working pressures in the process can be 75 bar or more, 80 bar or more, 90 bar or more; 95 bar or more and especially 120 bar or more, or even 140 bar or more. The upper pressure limit is not critically constrained but typically can be 200 bar or less, preferably 140 bar or less, or 120 bar or less. The pressure should suffice to keep the reactor solution in a single phase up to the point of the pressure reducing means, and to provide the necessary working pressure to convey the fluids through the plant.

The feed temperature may vary depending on the available exotherm and extent of monomer conversion desired to reach the polymerization temperature. Advantageously the feed temperature is no higher than 40° C., optionally no higher than 20° C., optionally no higher than 0° C., optionally no higher than −20° C. and optionally in the range of from −20° C. to −40° C. The polymerization temperature is constrained by the molecular weight desired, allowing for the influence of any hydrogen added. In a series reactor process the temperature in the successive reactors can be raised progressively in increments depending on the nature of the polymerization taking place in such reactors. Advantageously, the polymerization temperature for polymers comprising predominantly ethylene derived units is at least 100° C., preferably at least 150° C. or even (for lower molecular weight materials) 200° C. or more. The temperature should not exceed the polymerization decomposition temperature or the temperature at which the catalyst can sustain the polymerization reaction.

Overall the exotherm may lead to a temperature differential between the inlet temp of the polymerization reactor and the outlet of from 50 to 220 or up to 250° C. For example, by feeding at minus 40° C. and allowing the exotherm to raise the temperature to 210° C., a highly efficient process may result for producing lower molecular weight polymers. For higher molecular weight polymers, the temperature rise may need to be constrained via increased and warmer feed and/or lower reactor temperatures to avoid excessive viscosity in the reactor solution that would degrade reactor mixing performance, thereby leading to non-uniform polymers.

Alternatively, in some embodiments the feed temperature can be above 0° C., for example, at ambient temperature e.g., around 30° C. or even higher. In those embodiments, the heat exchangers for cooling the feed can be fed with cooling water, rather than being refrigerated, thereby reducing cost. The higher temperature of the solvent recycle may also avoid problems caused by fouling with polymer. However an increase in the feed temperature will result in a decrease in the amount of polymer made in the reactors for any given total reactor feed rate, for an adiabatic process.

Monomer concentration depends on the target polymer type and molecular weight, the associated conversions of monomer to polymer and operating temperature. Advantageously, the monomer partial pressure should be 30% or more of the total partial pressure of volatile components in the polymerization reactors; especially 40% or more, and should preferably not exceed 80%, 70% or especially 60%. The total partial pressure of all components should be less than 100% of the reactor pressure to avoid formation of vapor bubbles. In general, higher monomer partial pressures are preferred to improve the liquid phase separation in the liquid phase separator.

In its broadest form, the processes can be performed with any suitable catalyst, for example, a Ziegler Natta catalyst or a SSC (single sited catalyst). Preferably, a SSC is used. These generally contain a transition metal of Groups 3 to 10 of the Periodic Table; and at least one ancillary ligand that remains bonded to the transition metal during polymerization. Preferably the transition metal is used in a cationic state and stabilized by a cocatalyst or activator. Especially preferred are metallocenes of Group 4 of the Periodic table such as titanium, hafnium or zirconium which are used in polymerization in the $d^0$ mono-valent cationic state and have one or two ancillary ligands as described in more detail hereafter. The important features of such catalysts for coordination polymerization are the ligand capable of abstraction and that ligand into which the ethylene (olefinic) group can be inserted.

The catalyst is preferably a bulky ligand transition metal catalyst. The bulky ligand contains a multiplicity of bonded atoms, preferably carbon atoms, forming a group, which may be cyclic with one or more optional hetero-atoms. The bulky ligand may be metallocene-type cyclopentadienyl derivative, which can be mono- or poly-nuclear. One or more bulky ligands may be bonded to the transition metal atom. The bulky ligand is assumed, according to prevailing scientific theory, to remain in position in the course of polymerization to provide a homogenous polymerization effect. Other ligands may be bonded or coordinated to the transition metal, preferably detachable by a cocatalyst or activator, such as a hydrocarbyl or halogen-leaving group. It is assumed that detachment of any such ligand leads to the creation of a coordination site at which the olefin monomer can be inserted into the polymer chain. The transition metal atom is a Group 4, 5 or 6 transition metal of the Periodic Table of Elements. The transition metal atom is preferably a Group 4 atom.

Metallocene catalysts can be used with a cocatalyst which may be alumoxane preferably methylalumoxane having an average degree of oligomerization of from 4 to 30 as determined by vapor pressure osmometry. Alumoxane may be modified to provide solubility in linear alkanes or be used in a slurry but is generally used from a toluene solution. Such solutions may include unreacted trialkyl aluminum and the alumoxane concentration is generally indicated as mol Al per liter, which figure includes any trialkyl aluminum which has not reacted to form an oligomer. The alumoxane, when used as cocatalyst, is generally used in molar excess, at a mol ratio of 50 or more, preferably 100 or more, and preferably 1000 or less, preferably 500 or less, relative to the transition metal.

The SSC should preferably be selected from among a broad range, of available SSC's, to suit the type of polymer being made and the process window associated therewith in such a way that the polymer is produced under the process conditions at an activity of at least 40,000 g polymer per gram SSC (such as a metallocene), preferably at least 60,000 or even in excess of 100,000 g polymer per gram SSC. By enabling the different polymers to be produced in different operating windows with an optimized catalyst selection, the SSC and any ancillary catalyst components can be used in small quantities, with optionally also using small amounts of scavengers. The killer can be used in equally small amounts and the various cost-effective methods can then be introduced to allow the non-polar solvent to be recycled and subjected to treatment to remove polar contaminants before re-use in the polymerization reactor(s).

A metallocene may be also be used with a cocatalyst which is a non- or weakly coordinated anion. The term "non-coordinating anion" as used herein includes weakly coordinated anions. The coordination should be sufficiently weak in any event, as evidenced by the progress of polymerization, to permit the insertion of the unsaturated monomer component. The non-coordinating anion may be supplied and reacted with the metallocene in any of the manners described in the art.

The precursor for the non-coordinating anion may be used with a metallocene supplied in a reduced valency state. The precursor may undergo a redox reaction. The precursor may be an ion pair of which the precursor cation is neutralized and/or eliminated in some manner. The precursor cation may be an ammonium salt as in EP 0277003 and EP 0277004, each of which is incorprated herein by reference. The precursor cation may be a triphenylcarbonium derivative.

The non-coordinating anion can be a halogenated, tetraaryl-substituted Group 10-14 non-carbon element-based anion, especially those that are have fluorine groups substituted for hydrogen atoms on the aryl groups, or on alkyl substituents on those aryl groups.

The effective Group 10-14 element cocatalyst complexes are, in a preferable embodiment, derived from an ionic salt, comprising a 4-coordinate Group 10-14 element anionic complex, where $A^-$ can be represented as:

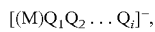

where M is one or more Group 10-14 metalloid or metal, preferably boron or aluminum, and each Q is a ligand effective for providing electronic or steric effects rendering $[(M')Q_1Q_2 \ldots Q_n]^-$ suitable as a non-coordinating anion as that is understood in the art, or a sufficient number of Q are such that $[(M')Q_1Q_2 \ldots Q_n]^-$ as a whole is an effective non-coordinating or weakly coordinating anion. Exemplary Q substituents specifically include fluorinated aryl groups, preferably perfluorinated aryl groups, and include substituted Q groups having substituents additional to the fluorine substitution, such as fluorinated hydrocarbyl groups. Preferred fluorinated aryl groups include phenyl, biphenyl, naphthyl and derivatives thereof.

The non-coordinating anion may be used in approximately equimolar amounts relative to the transition metal component, such as at least 0.25, preferably 0.5, and especially 0.8 and such as no more than 4, preferably 2 and especially 1.5.

Representative metallocene compounds can have the formula:

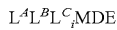

where, $L^A$ is a substituted cyclopentadienyl or hetero-cyclopentadienyl ancillary ligand π-bonded to M; $L^B$ is a member of the class of ancillary ligands defined for $L_A$, or is J, a hetero-atom ancillary ligand σ-bonded to M; the $L^A$ and $L^B$ ligands may be covalently bridged together through a Group 14 element linking group; $L^C_i$ is an optional neutral, non-oxidizing ligand having a dative bond to M (i equals 0 to 3); M is a Group 4 or 5 transition metal; and, D and E are independently mono-anionic labile ligands, each having a σ-bond to M, optionally bridged to each other or $L^A$ or $L^B$. The mono-anionic ligands are displaceable by a suitable activator to permit insertion of a polymerizable monomer or macro-monomer can insert for coordination polymerization on the vacant coordination site of the transition metal component.

Representative non-metallocene transition metal compounds usable as SSC's also include tetrabenzyl zirconium, tetra bis(trimethylsiylmethyl) zirconium, oxotris(trimethlsilylmethyl) vanadium, tetrabenzyl hafnium, tetrabenzyl titanium, bis(hexamethyl disilazido)dimethyl titanium, tris(trimethyl silyl methyl) niobium dichloride, and tris (trimethylsilylmethyl) tantalum dichloride.

Additional organometallic transition metal compounds suitable as olefin polymerization catalysts in accordance with the processes will be any of those Group 3-10 that can be converted by ligand abstraction into a catalytically active cation and stabilized in that active electronic state by a non-coordinating or weakly coordinating anion sufficiently labile to be displaced by an olefinically unsaturated monomer such as ethylene.

More preferred are metallocenes which are biscyclopentadienyl derivatives of a Group 4 transition metal, preferably zirconium or hafnium, for example, as disclosed in WO9941294, incorprated herein by reference. These may advantageously be derivatives containing a fluorenyl ligand and a cyclopentadienyl ligand connected by a single carbon and silicon atom, for example, as disclosed in WO 99/45040; and WO 99/45041, each of which is incorprated herein by reference. More preferably the Cp ring is unsubstituted and/or the bridge contains alkyl substituents, suitably alkylsilyl substituents to assist in the alkane solubility of the metallocene.

Dow in EP 0418044, incorporated herein by reference, discloses a monocyclopentadienyl compound similar that of EP 0416815. Similar compounds are described in ExxonMobil EP 0420436. Sumitomo in WO 97/03992, incorporated herein by reference, shows a catalyst in which a single Cp species and a phenol are linked by a C or Si linkage, such as $Me_2C(Cp)(3\text{-}tBu\text{-}5\text{-}Me\text{-}2\text{-}phenoxy)TiCl_2$. Nova in WO 2001/05849, incorporated herein by reference, discloses Cp-phosphinimine catalysts, such as $(Cp)((tBu)_3P=N-)TiCl_2$.

Other suitable metallocenes may be bisfluorenyl derivatives or unbridged indenyl derivatives which may be substituted at one or more positions on the fused ring with moieties which have the effect of increasing the molecular weight and so indirectly permit polymerization at higher temperatures such as described in EP 0693506 and EP 0780395, each of which is incorporated herein by reference.

When using the catalysts described above, the total catalyst system will generally additionally comprise one or more organometallic compounds as scavenger. Such compounds as used in this application is meant to include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The impurities, or catalyst poisons include water, oxygen, polar organic compounds, metal impurities, etc. Preferably steps are taken to remove these poisons before introduction of such into the reaction vessel, for example by chemical treatment or careful separation techniques after or during the synthesis or preparation of the various components, but some minor amounts of organometallic compound will still normally be used in the polymerization process itself.

Typically these compounds will be organometallic compounds such as the Group-13 organometallic compounds of U.S. Pat. Nos. 5,153,157, 5,241,025 and WO-A-91/09882, WO-A-94/03506, WO-A-93/14132, and that of WO 95/07941, each of which is incorprated herein by reference. Exemplary compounds include triethyl aluminum, triethyl borane, tri-isobutyl aluminum, tri-n-octyl aluminum, methylalumoxane, and isobutyl alumoxane. Alumoxane also may be used in scavenging amounts with other means of activation, e.g., methylalumoxane and tri-isobutyl-aluminoxane with boron-based activators. The amount of such compounds to be used with catalyst compounds is minimized during polymerization reactions to that amount effective to enhance activity (and with that amount necessary for activation of the catalyst compounds If used in a dual role) since excess amounts may act as catalyst poisons. A preferred scavenger is TNOA, which is preferably introduced neat, rather than in solution, to reduce cost and improve safety.

The process and the plant used in the process are designed as explained above to permit polymerization of a wide variety of polymer types and molecular weights. Generally speaking the polymers are derived from either ethylene or propylene as the dominant (more than 50 mol %) component. Polymers may preferably contain from 5 to 40 mol % of comonomer to vary crystallinity and flexibility. The comonomers may be alpha-olefins (under which term cyclic olefins such as styrene are included) having from 2 to 20 carbon atoms, such as ethylene (in the case of the polymer consisting predominantly of propylene derived units) 1-butene, 1-hexene, 1-octene. Amounts of dienes such as hexadiene, vinyl norbornene, ethylidene norbornene (ENB), norbornadiene, etc., may be included to promote unsaturation and/or the formation of longer branches themselves made from polymerized monomer derived units.

In the case of plastomer, the polymer which may be produced include the following aspects: Preferably, the comonomer is an alpha-olefin having from 3 to 15 carbon atoms, more preferably 4 to 12 carbon atoms and more preferably 4 to 10 carbon atoms. Ethylene can be polymerized with at least two comonomers to form a terpolymer. Monomer is generally polymerized in a proportion of 70.0-99.99, preferably 70-90 and more preferably 80-95 or 90-95 mol % of ethylene with 0.01-30, preferably 3-30 and more preferably 5-20 mol % comonomer. For the purposes of this patent specification the molecular weight distribution of a polymer can be determined with a Waters Gel Permeation Chromatograph equipped with Ultra-styrogel 5 columns and a refractive index detector. The operating temperature of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.10. The molecular weight distribution of the plastomers produced herein are termed "narrow" that is to say an $M_w/M_n$ less than 3, preferably less than or equal to 2.5. The MI of the polymers are generally in the range of 0.01 dg/min to 200 dg/min, preferably 0.1 dg/min to 100 dg/min, more preferably 0.2 to 50 dg/min and more preferably less than 10 dg/min. Contemplated densities of the plastomers are in the range of 0.85 to 0.93 $g/cm^3$, preferably 0.87 to 0.92 $g/cm^3$, more preferably 0.88 to 0.91 $g/cm^3$.

The processes can be especially concerned with copolymerization reactions involving the polymerization of one or more of the monomers, for example alpha-olefin monomers of ethylene, propylene, 1-butene, 1-pentene, 1,4-methyl-1-pentene, 1-hexene, 1-octene, 1-decene and cyclic olefins such as styrene. Other monomers can include polar vinyl, dienes, norbornene, acetylene and aldehyde monomers.

In the case of elastomers, the polymer which may be produced include terpolymers of an ethylene-α-olefin-EODE (Ethylene-alpha-Olefin-Diene Elastomer) of high weight average molecular weight ($M_w$) and greater than 0.3 wt % diene content, preferably greater than 2.0 wt % diene content. These polymers may be largely amorphous and have a low or zero heat of fusion. As used herein the term "EODE" encompasses elastomeric polymers comprised of ethylene, an a-olefin, and one or more non-conjugated diene monomers. The non-conjugated diene monomer can be a straight chain, branched chain or cyclic hydrocarbon diene having from 6 to 15 carbon atoms. Examples of suitable non-conjugated dienes are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,4-cyclohexadiene; and 1,5-cyclododecadiene; and multi-ring alicyclic fused and bridged ring dienes such as tetrahydroindene, methyl tetrahydroindene, dicyclopentadiene; bicyclo-1,5-(2,2,1)-hepta-2,5-diene; alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

Of the dienes typically used to prepare EPDMs, the particularly preferred dienes are, 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD). The preferred EOD elastomers may contain 20 wt % up to 90 wt % ethylene, more preferably 30 wt % to 85 wt % ethylene, more preferably 35 wt % to 80 wt % ethylene. The alpha-olefin suitable for use in the preparation of elastomers with ethylene and dienes are preferably propylene, 1-butene, 1-pentene, 1-hexene, 1-octene and 1-dodecene. The alpha-olefin is generally incorporated into the EODE polymer at 10 wt % to 80 wt %, more preferably at 20 wt % to 65 wt %. The non-conjugated dienes are generally incorporated into the EODE at 0.5 wt % to 20 wt % to 35 wt %; more preferably at 1 wt % to 15 wt %, and more preferably at 2 wt % to 12 wt %. If desired, more than one diene may be incorporated simultaneously, for example HD and ENB, with total diene incorporation within the limits specified above.

The elastomers may also be devoid of a diene and be a copolymer of two monomer types. Such copolymers may be elastomers of high $M_w$, low crystallinity, and low ash. The copolymers may be ethylene-alpha-olefin copolymers (EPC) of high $M_w$. As used herein the term "EPC" means a copolymer of ethylene and an alpha-olefin, not necessarily propylene, which exhibits the properties of an elastomer. The alpha-olefins suitable for use in the preparation of elastomers with ethylene are preferably $C_3$-$C_{10}$ alpha-olefins. Illustrative non-limiting examples of such alpha-olefins are propylene, 1-butene, 1-pentene, 1-hexene, 1-octene and 1-dodecene. If desired, more than one alpha-olefin may be incorporated. The EPC elastomers may contain 20 wt % up to 90 wt % ethylene, more preferably 30 wt % to 85 wt % ethylene, and more preferably 35 wt % to 80 wt % ethylene.

In the case of polymers derived predominantly from propylene derived units, the polymers have the following features as a result of the presence of isotactic polypropylene sequences in the chain.

In one embodiment, a copolymer of propylene and at least one comonomer, the comonomer being ethylene or an alpha-olefin. Comonomers include ethylene and linear or branched $C_4$ to $C_{30}$ alpha-olefins, or combinations thereof. Preferred linear alpha-olefins include ethylene and $C_4$ to $C_8$ alpha-olefins, more preferably ethylene, 1-butene, 1-hexene, and 1-octene, even more preferably ethylene or 1-butene. Preferred branched alpha-olefins include 4-methyl-1-pentene, 3-methyl-1-pentene, and 3,5,5-trimethyl-1-hexene. The propylene copolymer is preferably a random copolymer, as the term is defined herein below.

The polypropylene copolymer has a crystallinity of from 2% to 65%. Within this range of crystallinity, alternative lower limits of crystallinity can be 5% or 10%, and alternative upper limits of crystallinity can be 50%, 45% or 40%.

The crystallinity of the polypropylene copolymer is derived from isotactic (or alternatively syndiotactic) polypropylene sequences in the copolymer. The amount of propylene can be from 65 wt % to 95 wt %. Within this range, alternative lower limits of propylene content can be 70 wt % or 80 wt %, and alternative upper limits of propylene content can be 92.5 wt %, 90 wt %, or 89 wt %.

The semi-crystalline polypropylene copolymer necessarily has a non-zero heat of fusion, due to the measurable crystallinity. The crystallinity can be calculated from the heat of fusion, using a preferred value of 189 J/g for 100% crystallinity and a linear relationship between heat of fusion and crystallinity; see, B. Wunderlich, *Macromolecular Physics*, vol. 3, Academic Press (1980), esp. Chapter 8.4.2.

The polypropylene copolymer preferably has a single broad melting transition. Typically, a sample of the polypropylene copolymer will show secondary melting peaks or shoulders adjacent to the principal peak, and this combination is considered together as single melting point, i.e., a single broad melting transition. The highest of these peaks is considered the melting point. The polypropylene copolymer preferably has a melting point of from 25° C. to 110° C. Within this range, alternative lower limits of the melting point can be 30° C. or 35° C., and alternative upper limits of the melting point can be 105° C. or 90° C.

The weight average molecular weight of the polypropylene copolymer can be from 10,000 to 5,000,000 g/mol, preferably 80,000 to 500,000. The MWD is preferably above 2. The MWD may be less than 40, more preferably less than 5 and more preferably less than 3. In another embodiment, it is preferred that the polypropylene copolymer has a ML (1+4)@125° C. less than 100, more preferably less than 75, even more preferably less than 60, more preferably less than 30.

The polypropylene copolymer preferably is a random, crystallizable copolymer having a narrow compositional distribution. The intermolecular composition distribution of the polymer is determined by thermal fractionation in a solvent. A typical solvent is a saturated hydrocarbon such as hexane or heptane. The thermal fractionation procedure is described below. Typically, approximately 75 wt % and more preferably 85 wt % of the polymer is isolated as one or two adjacent, soluble fractions, with the balance of the polymer in immediately preceding or succeeding fractions. Each of these fractions has a composition (wt % ethylene content) with a difference of no greater than 20% (relative) and more preferably no greater than 10% (relative) from the average wt % ethylene content of the polypropylene copolymer. For purposes of the present disclosure, the polypropylene copolymer is considered to have a "narrow" compositional distribution if it meets the fractionation test outlined above.

The length and distribution of stereoregular propylene sequences in preferred polypropylene copolymers is consistent with substantially random statistical copolymerization. It is well known that sequence length and distribution are related to the copolymerization reactivity ratios. As used herein, the term "substantially random" means a copolymer for which the product of the reactivity ratios is generally 2 or less. In contrast, in stereoblock structures, the average length of PP sequences is greater than that of substantially random copolymers with a similar composition. Prior art polymers with stereoblock structure have a distribution of PP sequences consistent with these "blocky" structures rather than a random, substantially statistical distribution.

The reactivity ratios and sequence distribution of the polymer may be determined by C-13 NMR, which locates the ethylene residues in relation to the neighboring propylene residues. To produce a crystallizable copolymer with the required randomness and narrow composition distribution, it is desirable to use: (1) a single-sited catalyst; and (2) a well-mixed, continuous flow, stirred tank polymerization reactor which allows only a single polymerization environment for substantially all of the polymer chains of preferred polypropylene copolymers.

Preferred propylene-ethylene copolymers are described in U.S. Pat. No. 6,635,715, incorprated herein by reference.

As general guidance when the molecular weight of the polymers is too low, liquid phase separation in the manner described herein may be hindered or made inefficient as an excessive amount of polymer might then be carried over in the lean phase. The precise boundary depends on solvent composition and polymer composition as well as molecular weight. A rapid pressure let-down, generally greater than 20 bar/second, preferably 30 bar/second or more, more preferably 40 bar/second or more, even more preferably 50 bar/second or more, assists in inducing disengagement of the two phases. This rapid pressure decrease preferably starts from a pressure above the binodal boundary or LSCT and stops at a pressure below the spinodal boundary. The preferred phase separation is by spinodal decomposition and is called pressure induced phase separation (PIPS). Also the liquid phase separator should provide a sufficient residence time to permit the settlement of the lean and concentrated phase at the lower end of the separator.

Molecular weight control may be exercised through control of hydrogen levels, which may be supplementary to control of molecular weight by control of the polymerization temperature.

The lean phase may be passed in liquid form to a means for removing hydrogen added to or generated during polymerization, which means for removing comprises a means for contacting a stripping vapor with the lean phase in a countercurrent flow arrangement to concentrate the hydrogen in the vapor phase for removal from the lean phase recycle.

The stripping vapor preferably consists of a volatile monomer such as ethylene. The stripping vapor may be an inert gas such as nitrogen. The means may include a stripping vessel to remove hydrogen from the recovered solvent stream for use as the polymerization feed. The stripping vapor advantageously has a low hydrogen content, preferably below 5 mppm. The stripping vapor may be selected to be more volatile than other monomer or solvent components, be substantially devoid of contaminants that are deleterious to the polymerization catalysts, be recoverable in the plant recovery system, and preferably be available at high enough supply pressure for introduction into the stripping vessel without the aid of separate additional compression.

This embodiment is especially applicable to plant lay-outs where reactors are arranged to operate in series and where the upstream reactor is operated under no or low hydrogen conditions to provide a higher molecular weight fraction and where hydrogen is added to a downstream reactor to provide a lower molecular weight fraction.

With reference to FIG. 1 a plant for continuous solution polymerization is arranged as follows:

Polymerization and Initial Separation of Polymer and Solvent

A feed for polymerization is passed through conduit (2) by a centrifugal pump (3). The feed contains: A) isohexane as solvent, B) monomer, generally the predominant monomer is ethylene or propylene, and optionally C) comonomer which may be any copolymerizable alpha-olefin, and optionally D) a diene or other polyene or cyclic copolymerizable material. The feed is passed through a chiller or cooler (6) in which the feed is optionally chilled to a low temperature for subsequent adiabatic polymerization in the two continuous stirred tank reactors 8 which are operated in series or parallel (for simplicity, only one reactor is depicted in FIG. 1). Activator and metallocene catalyst may be premixed and added at 5 and/or 7 to one or both reactors 8. A scavenger, generally in the form of an alkyl aluminum such as tri-isobutyl aluminum or tri-n-octyl aluminum is added at 4 to minimize the impact of poisons in the feed and in the reactor on the catalyst activity.

To complement the molecular weight control provided by controlling the polymerization temperature, hydrogen may be added to one or both reactors through conduits (not shown).

The polymer-containing polymerization mixture, which emerges from the reactors 8 through a conduit 11, is first treated with a catalyst killer, water or preferably methanol, added at 10 in a molecular solution in isohexane solvent to terminate the polymerization reaction.

The mixing of the killer into the polymerization effluent may be done using an agitator in a small vessel through which the effluent passes and which has an injection point for the killer. Alternatively, a static mixer may be used to mix the killer into the polymerization effluent. That avoids the need for an agitator and an agitator seal but does require an increase in the pressure in the reactors in order to force effluent through the static mixer.

A heat exchanger 12 is arranged as part of a heat integrating arrangement and heated by a polymer-lean phase emerging from an upper layer 20 in a liquid phase separator 14, and provides an initial increase in the temperature of the polymer-containing polymerization reactor effluent in the conduit 11. A trim heat exchanger 16, heated by steam, hot oil or other high temperature fluid, further increases the temperature to a level suitable for liquid phase separation. The solution then passes through a let down valve 18 where a pressure drop is created which causes the separation of the polymer-containing polymerization reactor effluent and settlement into the polymer-lean phase 20 and a polymer-rich phase 22 below it.

Referring back to FIG. 1, the lean phase 20, after being cooled by the heat exchanger 12, aforementioned, is cooled further by a cooling device 24, passed through a surge tank 26 adapted for stripping out the hydrogen and then submitted to in-line chemical analysis at 43 to determine the concentration of monomer and comonomer in the solvent. This cooled lean phase 43 is combined with fresh feed of solvent and monomer 30 to provide the desired concentrations and then passed through a dryer 32 which serves to remove any unreacted methanol used as the catalyst killer or present in the fresh feed supplied or any impurity in the recycled solvent and monomer, as will be explained.

Figure 2:
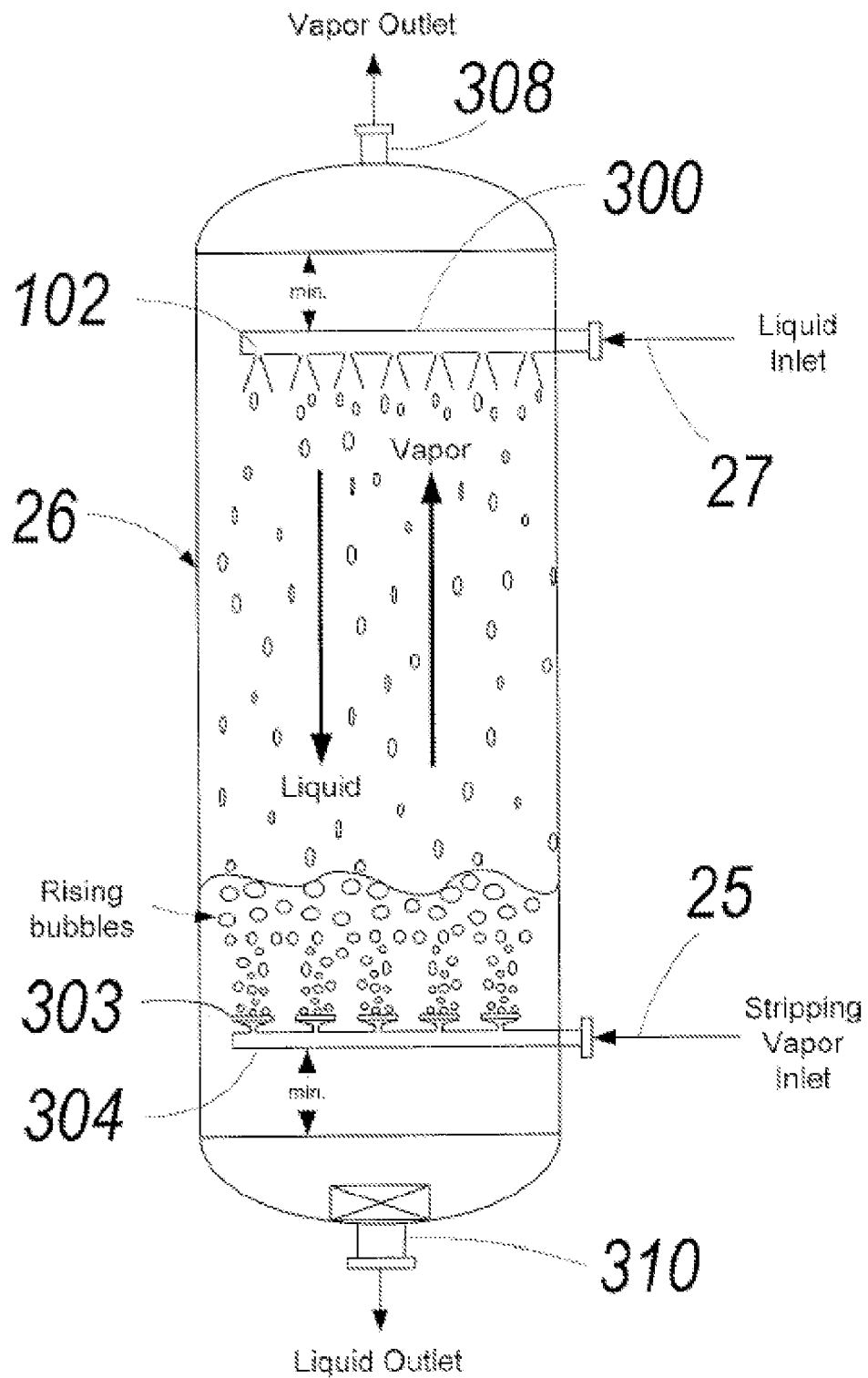
FIG. 2 shows a hydrogen-stripping arrangement for the plant of FIG. 1.

The surge tank 26 is arranged in the form a vessel 26 suitable for stripping out hydrogen by means of ethylene as a stripping vapor as is shown in FIG. 2. The lean phase issuing from the cooler 24 is passed through a conduit 27 to a liquid distributor arrangement 300 located inside the vessel 26 in an overhead space in an upper part thereof. The liquid distributor consists of a perforated pipe distributor with holes 302 on the bottom. The distributor sprays the lean phase downward inside the vessel 26. Lean phase collects in the lower part of the vessel 26. Part of the ethylene to be added to the feed conduit 2 is supplied as stripping vapor through line 25. The stripping vapor is supplied to a vapor sparger arrangement 304 located inside the vessel 26 submerged in the lean phase collected in the lower part of the vessel. The vapor sparger consists of multiple disks of microporous media 303 arranged on a plurality of rings, arranged concentrically. Vapor bubbles rise from the vapor sparger arrangement 304 through the liquid to the surface into the overhead space. The vapor in the overhead space is passed through conduit 308 for further treatment as described below. The liquid in the lower part is passed through conduit 310 for treatment as will be described below.

In the vessel 26a countercurrent flow of the liquid feed 27 and the stripping vapor 25 occurs. At the stage where the bubbles of stripping vapor rise through the liquid, the ethylene in the vapor is dissolved in the liquid and hydrogen in the liquid is taken up by the bubbles. Hence the liquid issuing through conduit 310 is enriched by ethylene which can be subjected to polymerization when recycled. A first equilibrium stage can so be approximated. In the vessel 26 vapor space, the rising vapor extracts more hydrogen from the atomized droplets issuing from the nozzles 302 so that a second equilibrium stage can be approximated. The vapor issuing through conduit 308 thus contains a large proportion of the hydrogen contained in the liquid introduced though nozzles 302. Substantially 2 equilibrium stages of separation can be achieved in a single flash vessel. Over 80%, sometimes over 90%, and sometimes over 97%, of the hydrogen present in the lean phase can be removed in this way.

The stripping vapor supplied is ethylene, which is a volatile monomer indigenous to the process. Its use minimizes additional operating costs and raw material consumption. Alternately nitrogen or other inert gases may be used advantageously in stripping hydrogen from the recycle solvent entering the solvent accumulator. However, such gases increase the load on the light ends compressor and may result in higher total purge rates including that of the monomers from the plant.

The vapor from conduit 308 is routed to the reflux drum 39 of tower 36. Partly it is processed to recover valuable components, principally volatile monomers such as ethylene and propylene, by fractionating tower 36 and its overhead vapor compression/condensation system for recycling through conduit 43 to the inlet side of the drier 32. The part mainly comprising hydrogen and any other non-condensables may be flared.

A less preferred alternative is for part of the lean phase recycle to be flashed in a single stage flash vessel without the addition of stripping vapor. This, however, only permits limited hydrogen removal and detracts from the benefit of recycling the lean phase in its liquid state without energy intensive evaporation processes.

In single reactor and in series reactor arrangements using metallocene catalysts systems varying amounts of hydrogen may be produced by beta-hydride abstraction, even when no hydrogen is injected into the reactor. The amount may vary with metallocene selected. Its molecular weight reducing effect may be accommodated by appropriate selection of the reactor operating temperature. A substantial amount of this hydrogen may remain unreacted in the reactor effluent stream 11. Reducing the amount of hydrogen recycled in this stream in the manner described above may be is advantageous to permit adjustment of the molecular weight independent of the polymerization operating temperature by removal of the generated hydrogen or by addition of hydrogen from an external source, generally in the feed conduit 2.

In series reactor operation as described herein, the ability to remove hydrogen can be exploited advantageously to widen the molecular weight split between the reactors and to broaden the molecular weight distribution beyond what would otherwise be possible. The feed supplied to the upstream reactor can have a hydrogen content below that which would prevail if hydrogen generated by beta hydride elimination remained in the recycle. Additional extraneous hydrogen can be added to the downstream reactor to provide a hydrogen content above that which would remain if hydrogen from beta hydride elimination were to remain in the recycle.

Effective removal of the hydrogen thus provides a facility which enables the range of bimodal compositions produced in series reactor lay outs to be increased. It also permits the selection of a broader range of metallocene catalyst systems regardless of their tendency to generate hydrogen through beta hydride elimination or their sensitivity to the presence of hydrogen in the polymerization mixture.

Some of the higher olefin feed streams, such as for example butene are valued as monomers because of their alpha-olefins content. However, such monomer streams often contain small amounts, typically less than 10 wt %, sometimes less than 1 wt %, and sometimes even less than 0.1 wt % of inert saturated hydrocarbons, such as propane and/or butane, and sometimes other isomers and di-olefins, such as butadiene and/or isobutylene and/or mono-olefins other than alpha-olefins which may detract from catalyst activity. Such species have also been found to act as chain transfer agents, thereby decreasing the molecular weight of the polymer made in the reactor. In addition, these light impurities such as propane, butane, di-olefins, and undesirable isomers, may concentrate in the recycle solvent to levels that curtail the amount of fresh monomer that can be introduced into the reactor feed because they increase the vapor pressure—at times to levels that may cause bubbles to form in the reactor feed pump. This phenomenon may damage the pump. Such species may also decrease the overall density of the mixture of polymer, solvents, residual monomers etc., which is the reactor effluent thereby causing the product heater 16 to be fouled with polymer that has separated from the bulk of the mixture. For all these reasons, it is advantageous to strip these undesirable species at a faster rate by purging more of the gases from the light ends stream leaving the chiller 39. This can be accomplished by decreasing the compressor discharge pressure and/or by increasing the operating temperature of the cooler and flash drum downstream of the compressor.

Treatment of Polymer-Rich Phase

The concentrated polymer-rich phase is passed to a low-pressure separator 34 where evaporated solvent and monomer are separated from the more concentrated polymer solution emerging from the liquid phase separator 14.

The evaporated solvent and monomer phase is passed through conduit 35 in a vapor phase to the purification tower 36 operating by distillation to separate a light fraction of the highly volatile solvent and unreacted ethylene and propylene on the one hand and heavier less volatile components such as hexane and any toluene used to dissolve catalyst or activator and unreacted diene type comonomers on the other hand. Use of toluene can be reduced under appropriate circumstances by a suitable selection of catalyst components and catalyst preparation conditions such as increases in catalyst solution temperature to increase the solubility of the catalyst components to reach a point where so little toluene is present that no separate process for the removal of the toluene are required.

A gear pump 38 conveys the by now even more concentrated polymer to a vacuum devolatilizing extruder or mixer 40, where again a vapor phase is drawn off for purification, condensed and then pumped to a purification tower 50. A heavy fraction of toluene used as catalyst solvent and diene such as ethylene norbornadiene (ENB) comonomer or 1-octene comonomer are recovered by this purification tower 50. The ENB or octene can be recycled through outlet 54. Alternative heavy comonomers, such as ENB and octene, may thereby be stored in separate storage vessels 55, 56, which facilitates rapid product transitions between different product families (e.g. EP(D)M and EO plastomers)), while still enabling eventual recovery of the valuable unreacted comonomers. This capability further enhances the flexibility of this process to produce a wide variety of dissimilar products.

The polymer melt emerging from 40 can then be pelletized in an underwater pelletizer, fed with water chilled at 42, washed and spun dried at 44 to form pellets suitable for bagging or baling at 46.

The vapor from the devolatiliser is treated to recover and recycle the solvent. In one embodiment, the vapors may pass through a wash tower, a refrigerated heat exchanger and then through a series of compressors and pumps. The final pump is a liquid ring pump which feeds liquid condensate to a drum, from which vapors go to flare. Optionally, nitrogen is sparged into the liquid condensate discharged from the liquid ring pump to help carry butane and propane and other C4 contaminents to the flare. The addition of nitrogen may be carried out independently or concurrently with the elevation of the temperature or by decreasing the operation of the light ends compressor downstream of equipment 39 of FIG. 1.

Figure 3:
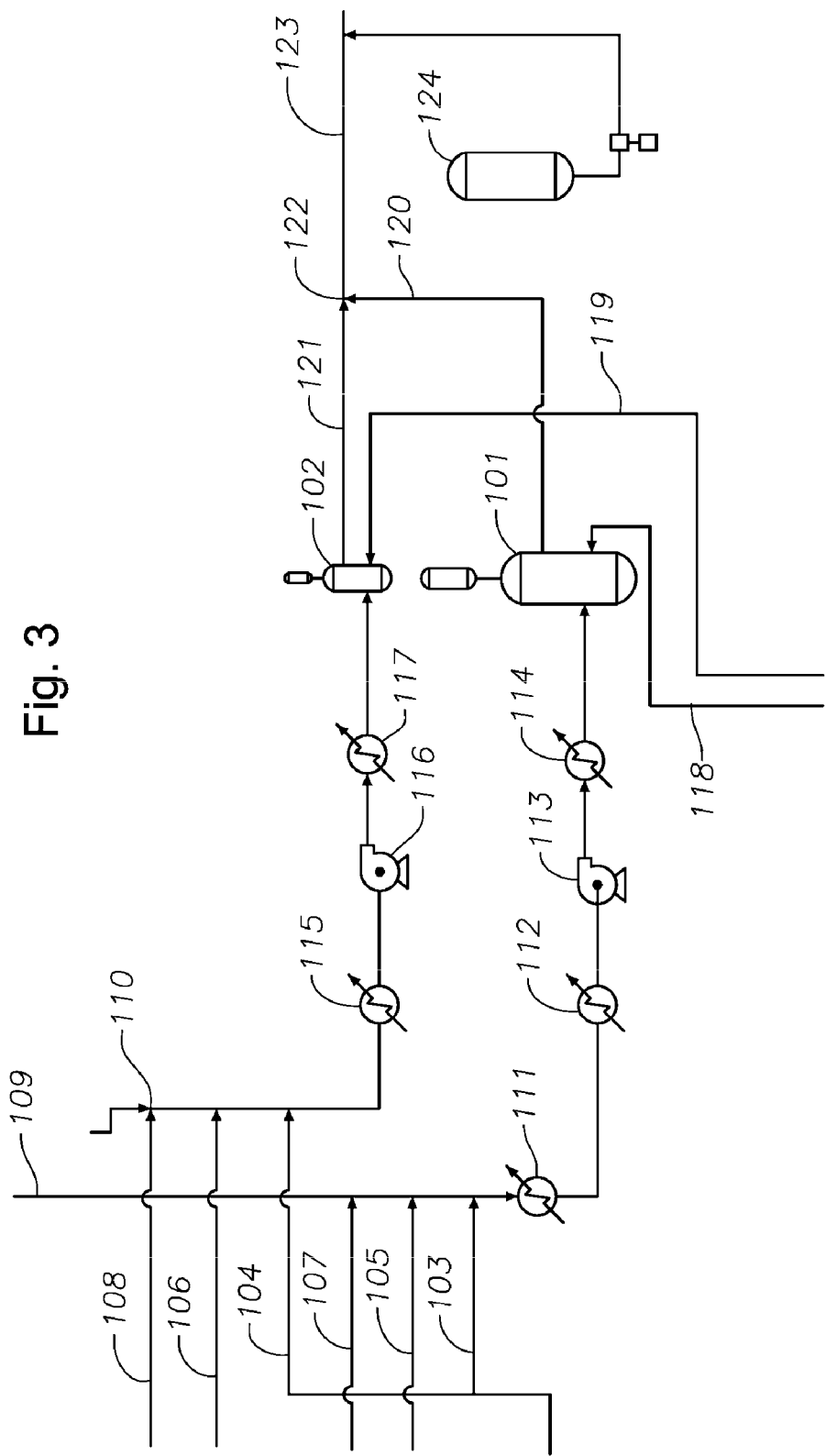
FIG. 3 shows schematically a feed blending and cooling layout in a plant having a primary and a secondary reactor according to one embodiment.

FIG. 3 shows one embodiment of an arrangement in accordance with the first, second, third and fourth aspects. FIG. 3 shows part of a polymerization plant having a primary reactor 101 and a secondary reactor 102 arranged to operate in parallel. Each reactor is a continuous stirred tank reactor provided with a vertical stirrer shaft driven by an overhead motor. FIG. 3 also shows the feed blending means for each reactor. Hydrogen from a pipeline is supplied through lines 103 and 104, scavenger in the form of TNOA is supplied from a storage tank (not shown) through lines 105 and 106 and fresh ethylene is supplied from a low pressure pipeline (not shown) through conduits 107 and 108. Isohexane which is a mixture of recycled isohexane and make up isohexane and which also contains a small amount of residual ethylene together with optional additions of propylene and 1-butene enters through the lines 109 and 110. Ethylene supply line 107 supplies ethylene to conduit 109 by means of a sparger in the form of a perforated plate through which the ethylene bubbles into the flow of isohexane being carried through conduit 109. Conduits 105 and 103 supply activator and hydrogen to the solvent in conduit 109 to form a feed which flows through the first heat exchanger 111, second heat exchanger 112, centrifugal pump 113, third heat exchanger 114 and then into the primary reactor 101.

In a similar manner ethylene is supplied through conduit 108 to the solvent passing through conduit 110 via a similar sparger unit. Downstream of the ethylene sparger conduits 106 and 104 join conduit 110 for the supply of activator and hydrogen, thereby making a secondary feed for secondary reactor 102. That secondary feed passes through fourth heat exchanger 115, centrifugal pump 116 and fifth heat exchanger 117 before entering the secondary reactor 102.

A mixture of catalyst and activator is supplied to the primary reactor 101 through line 118. Similarly, a mixture of catalyst and activator is supplied to the secondary reactor 102 through line 119. Polymerization reactions take place within reactors 101 and 102 to form polymer containing polymerization mixtures therein. Primary reactor 101 is larger than secondary reactor 102 with the internal volumes of the two reactors being in the ratio of 70:30. In that way a copolymer blend comprising a first component in an amount of 70% made in the primary reactor and a second component in an amount of 30% made in the secondary reactor 102 can be prepared in a process in which the residence times in each of the primary and secondary reactors are approximately equal and therefore both can be kept at a manageable level. In one embodiment, the reactors can be switched to operate in series, for example when making EPDM grades or when a specific tailored molecular weight distribution is required, wherein it may be desirable to get a 20:80 split and at other times, an 80:20 split between the first and second reactors. Polymer containing polymerization effluent leaves the primary reactor 101 through conduit 120 and polymer containing polymerization effluent leaves second reactor 102 via conduit 121. Conduits 120 and 121 meet at mixing junction 122 and the combined effluent flows through conduit 123 into which methanol from tank 124 is injected as a catalyst killer.

Each of the first, second, third, fourth and fifth heat exchangers 111, 112, 114, 115 and 117 are tube-in-shell heat exchangers having a four pass arrangement comprising two arrays of U-tubes mounted horizontally in the shell. The shells are supplied with propylene as refrigerant from a three stage compressor (not shown in FIG. 3). First heat exchanger 111, second heat exchanger 112 and third heat exchanger 115 have 1 inch (25.4 mm) tubes whereas third exchanger 114 and fifth exchanger 117, being downstream of pumps 113 and 116 respectively and therefore subject to higher pressures, have ¾ inch (19.05 mm) tubes.

That isohexane entering through conduit 109 has been cooled by the recycle heat exchanger (not shown) to a temperature of approximately 12° C. and passed through an array of drier beds to remove methanol and any water present. The entry of the monomer streams through conduits 107 and 105 and the entering of the hydrogen through conduit 103 raises the temperature of the feed to approximately 16° C. The first heat exchanger 111 cools the feed to 12° C. and second heat exchanger 112 cools it further to −17° C. The feed then enters pump 113 which compresses it to a pressure of 120 bar and that compression results in a temperature rise of the feed up to −10° C. Third heat exchanger 114 reduces the temperature down to approximately −35° C. before the feed enters the primary reactor 101.

The secondary feed passing through conduit 110 to the secondary reactor 102 has a temperature of approximately 16° C. upstream of the fourth heat exchanger 115 and that fourth heat exchanger cools the feed to −17° C. Passage through the pump 116, which compresses the feed to approximately 120 bar, raises the temperature of the secondary feed somewhat. Fifth heat exchanger 117 reduces the temperature of the secondary feed to −35° C. prior to entry into the secondary reactor 102. The layout of the heat exchangers and in particular the presence in each feed line of a heat exchanger downstream of the pumps 113 and 116 enables the temperature rise caused by those pumps to be reversed. In order to gain additional productivity, those downstream heat exchangers 114 and 117 could if desired reduce the temperature of the feeds yet further down to the practical limit imposed by the propylene refrigerant of approximately −42° C.

Figure 4:
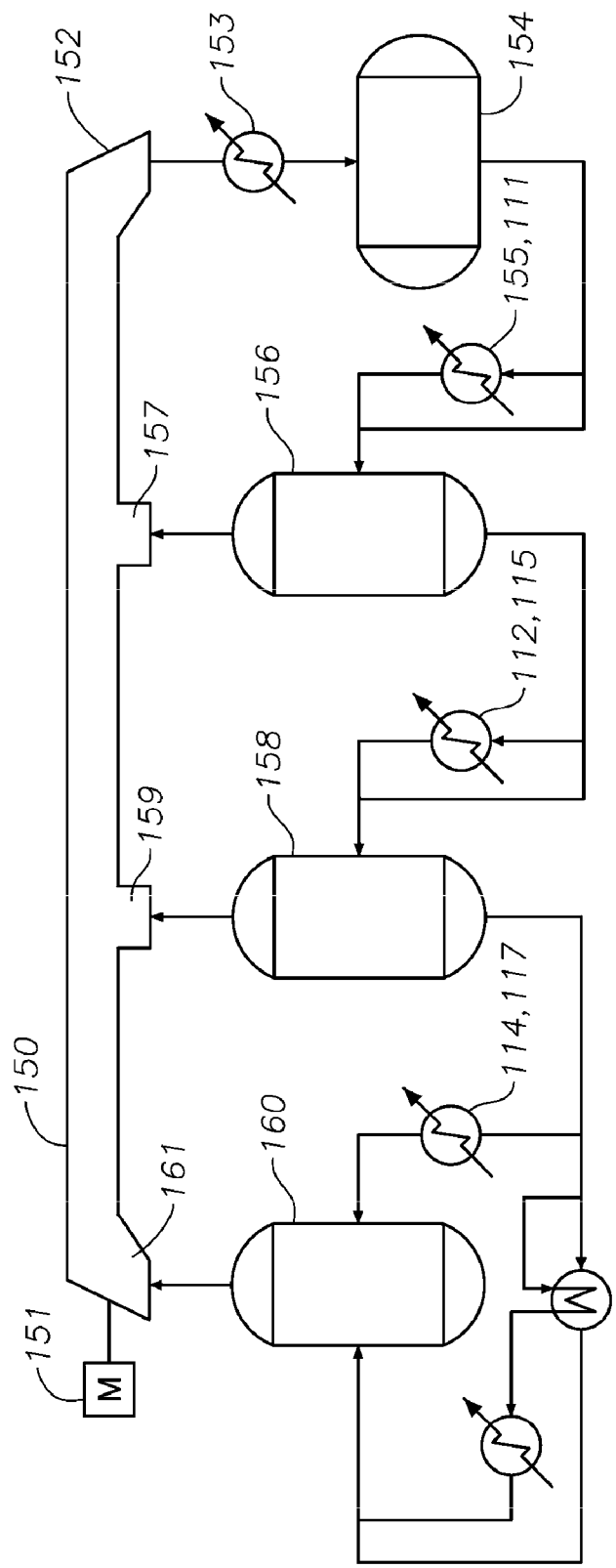
FIG. 4 shows schematically a three stage compressor for supplying refrigerant to refrigerated heat exchangers in accordance with one embodiment.

FIG. 4 shows the layout in schematic form of the refrigeration system used to supply the various refrigerated heat exchangers in the plant with refrigerant propylene. The refrigerant system comprises a common three stage centrifugal compressor 150 which is driven by an electric motor 151. The propylene refrigerant composition is 99 wt % propylene and 1 wt % propane. The compressor compresses the propylene to a pressure of approximately 1700 kPag and the pressurized propylene flows from an outlet 152 through a heat exchanger 153 which is cooled by cooling water and which condenses the high pressure propylene entirely to liquid which flows into accumulator drum 154. The liquid propylene refrigerant is supplied from the accumulator to a solvent recycle heat exchanger 155 in the solvent recycle system and to first heat exchanger 111 in the feed line to the primary reactor 101 and optionally to other heat exchangers in the plant, for example, for cooling pelletizer cooling water. (For clarity, all those heat exchangers are designated by a single symbol in FIG. 4). Propylene gas vaporized in the heat exchangers 111, 155 is returned to the first suction drum 156 in which propylene vapor is separated from propylene liquid. The propylene vapor flows as an overhead stream into the first suction port 157 at a temperature of −42° C.

Liquid propylene is drawn from the bottom of first suction drum 156 and is supplied to a variety of heat exchangers in the plant including the second and fourth heat exchangers, that is, the two heat exchangers 112 and 115 immediately upstream of the pumps 113 and 116 in the primary and secondary feeds to the primary and secondary reactors. Once again, for clarity only one heat exchanger symbol is shown in FIG. 4. Vaporized propylene from those heat exchangers returns via conduits to second suction drum 158 from which propylene vapor at a temperature of −29° C. is drawn into second suction port 159 of the compressor 150. Liquid propylene is drawn from the bottom of suction drum 158 and is supplied to the third and fifth heat exchangers 114, 117 which are located downstream of pumps 113 and 116 and upstream of the primary reactor 101 and 102, respectively. Once again, those two heat exchangers are denoted by a single symbol in FIG. 4 for clarity. Propylene vapor returns from those heat exchangers 114, 117 to the third suction drum 160 from where it is drawn into third suction port 161 of compressor 150 at a temperature of about 0° C. Compressor 150 compresses the propylene vapor entering the first suction 161 and then mixes that compressed vapor with propylene vapor entering second suction port 159 for compression and mixture with vapor entering the first suction port 157. The combined vapors are pressurized yet again before leaving the compressor through outlet 152.

Figure 5C:
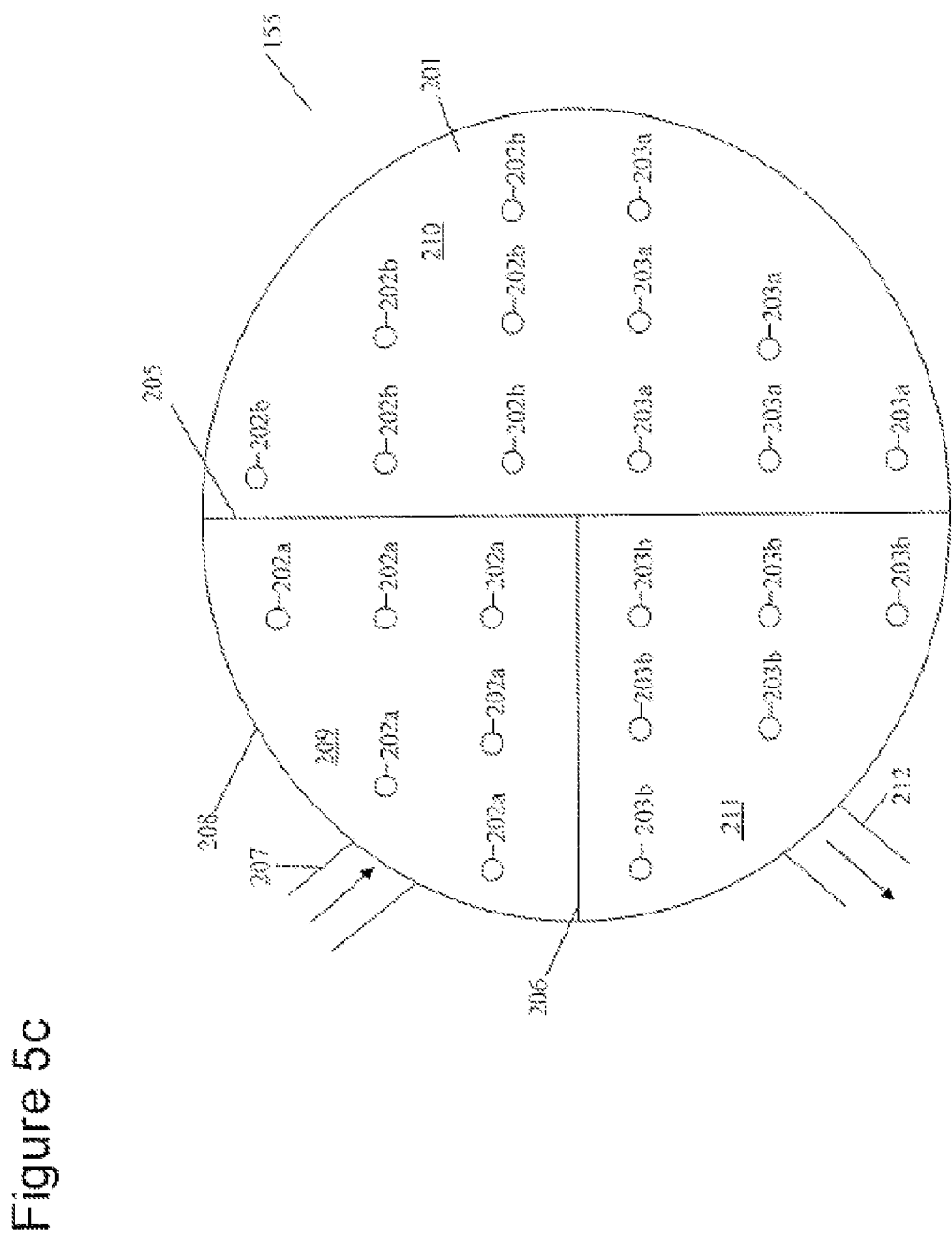

FIGS. 5a to 5c show in schematic form the layout of a four pass U-tube kettle heat exchanger for use with the seventh and eighth aspects. FIG. 5a is a view from above showing a horizontal cross-section through the solvent recycle heat exchanger 155, FIG. 5b is a view from the side showing a vertical section through the heat exchanger. The heat exchanger 155 has an inlet and outlet end 155a and a kettle or shell portion 155b. The bottom of the kettle portion 155b has an inlet 155c for refrigerant propylene from accumulator drum 154 of compressor 150 and the top of the kettle 155b has an outlet 155d for propylene vapor returning to first suction drum 156 of compressor 150.

Inside the kettle portion 155b an upper array of U-tubes 202 (for clarity only one U-tube is shown in FIG. 5a) extends from the inlet/outlet portion 155a along almost the full length of the kettle portion 155b. Underneath the upper array of U-tubes 202, a lower array of U-tubes 203 similarly extends from the inlet/outlet portion 155a along almost the full length of the kettle portion 155b (only one upper tube 202 and one lower U-tube 203 is shown in FIG. 5b).

In use, recycle solvent flows through inlet 207 into the inlet/outlet portion 155a and down one leg 202c of the upper array of U-tubes 202 and back to the inlet/outlet portion via the other leg 202d of the U-tubes 202. The recycle solvent then flows down one leg of the lower array of U-tubes 203 and back along the other leg to the inlet/outlet portion 155a. The cooled recycle solvent then leaves the inlet/outlet portion 155a through outlet 212 to go to downstream dryers and back to the feed blending section.

The inlet/outlet portion 155a is separated from the kettle portion 155b by an end plate 201, shown in more detail in FIG. 5c.

Circular end plate 201 of the heat exchanger is provided with inlets 202a to the upper array of U-tubes 202 which project behind plate 201 and which return to plate 201 at tube outlets 202b. FIG. 5c also shows inlets 203a and outlets 203b to the lower array of U-tubes 203a.

The inlet/outlet portion 155a of the heat exchanger 155, of which plate 201 forms one wall, is provided by a vertical dividing baffle 205 which separates upper tube inlets 202a from upper tube outlets 202b and lower tube inlets 203a from lower tube outlets 203b. The end chamber is also provided with a horizontal baffle 206 which upper divides inlets 202a of the upper array of U-tubes 202 from lower outlets 203b of the lower array of tubes 203.

In use of the heat exchanger 155 located in the recycle circuit for recycling solvent (optionally containing some residual monomer) back to the feed blending apparatus, the recycle solvent, principally isohexane, enters the heat exchanger 155 through inlet 207. That recycle solvent enters a quadrant-shaped chamber defined by the upper half of vertical baffle 205, horizontal baffle 206, the cylindrical wall 208 of the heat exchanger and the end wall 213 of the heat exchanger, together with plate 201. The recycle solvent leaves that quadrant-shaped chamber 209 through the inlets 202a to the upper U-tubes 202 and is carried along the upper U-tubes 202 in the shell of the heat exchanger, retuning via outlets 202b. Outlets 202b empty into semi-circular chamber 210 defined by vertical baffle 205, the cylindrical wall 208 of the heat exchanger, plate 201 and end wall 213. The recycle solvent leaves chamber 210 via inlets 203a to the lower array of U-tubes 203 and returns via outlets 203b into quadrant-shaped chamber 211.

The recycle solvent exits that chamber 211 via outlet 212 to downstream equipment including drying beds for further purification before returning to the feed blending apparatus.

Over prolonged use of the heat exchanger 155, the upper array of U-tubes becomes fouled with polymer deposited from the recycle solvent. The fouling is worst in the upper array of U-tubes where the initial cooling effect is the greatest. When it is desired to defoul the heat exchanger the supply of propylene to the kettle or shell portion 155b is reduced or cut off such that the propylene inside the kettle portion 155b partially boils away to leave the upper array of tubes 202 exposed. At that point the recycle solvent flowing through upper array of tubes 202 begins to warm up and re-dissolves the polymer fouling that upper array of tubes 202. Once the polymer has been re-dissolved the propylene supply to the shell is restored thereby covering the upper array of tubes 202 once more with liquid propylene refrigerant.

The minimum level of propylene in the kettle 155b is determined by the maximum allowable temperature for the stream of recycle solvent. Many variations are possible. For example, the heat exchanger could be a two pass exchanger having an array of straight tubes and a lower array of straight tubes.

The other heat exchangers in the plant may be defouled in the same way.

The words "shell" and "kettle" are used interchangeably herein.

Polymerization of Differing Polymers

The operation of the plant of FIG. 1 and the plant are illustrated with reference to Table 1 on the following page. Table 1 takes as examples polymerization processes to make: (1) a low molecular weight plastomer, as described generally above, (2) a higher molecular weight elastomer, as described above, and (3) a high propylene content ethylene copolymer polymerized, as described above.

ture rise to 220° C. A rapid pressure drop results as the polymerization mixture passes through the let-down valve 18 into the liquid phase separator, with the pressure dropping quickly from 100 bar to 40 bar. The pressure differential between that at the outlet of the pump 3 and the outlet of the let down valve 18 is solely responsible for causing the feed and the polymerization mixture to flow through the reactor 8 and the conduit 11 including the heat exchangers 12 and 16.

Inside the separator 14 an upper lean phase is formed with less than 0.1 wt % of polymer and a lower polymer rich phase with 30 wt % to 40 wt % of polymer. The concentration is approximately double to triple that of the polymerization mixture fed to the separator 14. After further removal of solvent and monomer in the low-pressure separator 34 and the extruder 40, polymer can be removed from the plant containing less than 1 wt %, preferably with 0.3 wt % or less, even more preferably <0.1 wt % of volatiles, including water.

If the use of the plant is now compared with the row in Table 1 marked elastomer, it can be seen that although the polymerization temperature is lower than for plastomer, and

TABLE 1

Process Conditions of the Plant/Process in Varying Operating Modes

| | Feed Into Reactor | Polymerization Inside Reactor | Polymer Solution Upstream Let-Down Valve | Polymer Solution Downstream Let-Down Valve | Polymer Lean Phase | Polymer Rich Phase |
|---|---|---|---|---|---|---|
| Plastomer | 50 or down to −15° C.; 120 bar total; 50 bar monomer partial pressure. | 130-200° C.; 100 to 130 bar; 7-22 wt % polymer | 220° C.; 100 to 130 bar; 15-22 wt % polymer | 220° C.; 30 to 45 bar; 15-22 wt % polymer | 220° C.; 30 to 45 bar; <0.3 wt % polymer | 220° C.; 30 to 40 bar; 25-40 wt % polymer |
| Elastomer | 50 or down to −15° C.; 120 bar total; 50 bar monomer partial pressure. | 85° C. to 150° C.; 100 to 130 bar; 8-15 wt % polymer | 220° C.; 100 to 130 bar; 8-15 wt % polymer | 220° C.; 30 to 45 bar; 8-15 wt % polymer | 220° C.; 30 to 45 bar; <0.3 wt % polymer | 220° C.; 30 to 40 bar; 25-40 wt % polymer |
| Predominant Propylene Content Copolymer | 50 or down to −35° C.; 120 bar total; 50 bar monomer partial pressure. | 50 or 80° C.; 100 to 130 bar; 5-15 wt % polymer | 200° C.; 100 bar to 130 bar; 5-15 wt % polymer | 200° C.; 30 to 45 bar; 5-15 wt % polymer | 200° C.; 30 to 45 bar; <0.3 wt % polymer | 220° C.; 30 to 40 bar; 20-40 wt % polymer |

To make plastomer in FIG. 1, the feed temperature is reduced by the chiller 6 to 0° C. Aluminum alkyl is added as scavenger in amounts appropriate to the poison content of the feed. Alternatively, the process of WO 97/22635 (Turner et al.) incorporated herein by reference. The pressure is raised by the centrifugal pump to 120 bar. The feed comprising largely solvent and up to 50 bar partial pressure of ethylene and butene or hexene or octene comonomer then enters the first of the two series reactors 8. Catalyst and activator is added to the reactors 8 in amounts to create the desired polymerization temperature which in turn is related to the desired molecular weight. The heat of polymerization increases the temperature to 150° C. to 200° C. to form a plastomer without the use of hydrogen (although H$_2$ may be used). At the outlet of the second series reactor, the polymer concentration is in the range of from 15 wt % to 22 wt %. The general conditions may be as described in WO 99/45041 incorporated herein by reference.

Water is then supplied at 10 to kill or neutralize the polymerization reaction which might otherwise continue in the presence of surviving catalyst, unreacted monomer, and elevated temperature.

The heat exchanger 12 raises the temperature initially and then the further heat exchanger 16 causes a further temperathe polymer concentration emerging from the reactor is lower (its viscosity will be similar to that for plastomers), the same separation process and plant can be used to give an output which is somewhat lower (reflecting the reduced efficiency of the polymerization process at lower temperatures). With two reactors in series, the disclosure of WO 99/45047 (Harrington et al.) may be used, which document is incorporated herein by reference. Generally speaking, in a series lay out it is preferable that the first reactor operates at temperatures between 0° C. to 110° C. and the second reactor operates between 40° C. to 140° C. Preferably, the first reactor operates at temperatures between 10° C. to 90° C. and the second reactor operates between 50° C. to 120° C. More preferably, the first reactor operates at temperatures between 20° C. to 70° C. and the second reactor operates between 60° C. to 110° C. With appropriate control of process conditions and poison levels temperature of this order of magnitude can also be obtained where one reactor only is used or two reactors are used under the same process conditions.

The same can be said about the row in Table 1 marked "Predominant propylene content copolymer" where the temperature is lowered to allow the less reactive propylene monomer to form a sufficiently high molecular weight. The general conditions described in WO 00/01745, which is incorporated herein by reference, can be used. In the runs, the polymerization temperature varied between 28° C. and 70° C.

All documents cited herein are fully incorporated by reference for all jurisdictions in which such incorporation is permitted and to the extent they are not inconsistent with this specification. All documents to which priority are claimed are fully incorporated by reference for all jurisdictions in which such incorporation is permitted. Although dependent claims have single dependencies in accordance with U.S. practice, each of the features in any of the dependent claims can be combined with each of the features of one or more of the other dependent claims dependent upon the same independent claim or claims.

What is claimed is:

1. A plant for the continuous solution polymerization of one or more olefin monomers, the plant comprising:
    a primary reactor and a secondary reactor arranged to operate in parallel, the ratio of the internal volume of the primary reactor to the internal volume of the secondary reactor being in the range of from 60:40 to 95:5;
    a primary feed line for supplying a primary feed comprising one or more olefin monomers in a solvent to the primary reactor, and a primary catalyst supply apparatus for supplying a first polymerization catalyst to the primary reactor, to form a primary polymer-containing polymerization reaction mixture therein;
    a secondary feed line for supplying a secondary feed comprising one or more olefin monomers in a solvent to the secondary reactor, and a secondary catalyst supply apparatus for supplying a secondary polymerization catalyst to the secondary reactor, to form a secondary polymer-containing polymerization reaction mixture therein;
    a junction for combining the primary and secondary polymer-containing polymerization reaction mixtures downstream of the primary and secondary reactors to form a combined polymerization reaction mixture, and
    at least one separator for isolating polymer from the combined polymerization reaction mixture.

2. A plant as claimed in claim 1 in which the ratio of the volume of the primary reactor to the volume of the secondary reactor is in the range of from 65:35 to 90:10.

3. A plant as claimed in claim 1 in which the primary feed comprises a mixture of ethylene and propylene and the primary catalyst is a chiral metallocene catalyst such that in the primary reactor is formed a co-polymer of ethylene and propylene having crystallinity of from about 2 to about 65% from isotactic polypropylene sequences, a propylene content of from about 75 wt. % to 90 wt. % and a melting point of 25° C. to 105° C., and the secondary feed comprises propylene or a mixture of propylene and one or more monomers selected from a group consisting of C2 or C4 to C10 alphaolefins and the secondary polymer-containing polymerization reaction mixture comprises a substantially isotactic polypropylene polymer containing at least about 90 wt.% polymerized propylene and a melting point greater than about 110° C.

4. A plant as claimed in claim 1 in which the ratio of polymer production rate in the first reactor to polymer production rate in the second reactor is in the range of from 95:5 to 60:40.

5. A plant, as claimed in claim 1, in which said means for supplying comprises at least one pump.

* * * * *